United States Patent [19]

Hebel

[11] 4,276,947

[45] Jul. 7, 1981

[54] ROLLER BELLEVILLE SPRING DAMPER

[75] Inventor: James B. Hebel, Houston, Tex.

[73] Assignee: Smith International, Inc., Newport Beach, Calif.

[21] Appl. No.: 38,790

[22] Filed: May 14, 1979

[51] Int. Cl.³ .............................................. E21B 17/00
[52] U.S. Cl. ...................................... 175/321; 64/23; 267/160; 267/162
[58] Field of Search ...................... 175/107, 321, 297; 267/161, 162, 160; 64/23

[56] References Cited

U.S. PATENT DOCUMENTS

| 1,641,059 | 8/1927 | Tausch | 267/162 |
| 2,675,225 | 4/1954 | Migney | 267/162 |
| 4,133,516 | 1/1979 | Jurgens | 175/321 |
| 4,139,994 | 2/1979 | Alther | 175/321 |

Primary Examiner—William F. Pate, III
Attorney, Agent, or Firm—Murray Robinson; Ned L. Conley; David Alan Rose

[57] ABSTRACT

A double acting damper for use in rotary drilling includes a splined tubular telescopic joint and employs plural paralleled stacks of double acting series stacked roller Belleville spring washers in an annular pocket between the inner and outer tubular members of the joint. The springs, spline and telescopic bearings are in an oil filled volume sealed from the outside by a pressure seal at the lower end of the damper and a floating seal at the upper end. Electric and magnetic means are provided to check on the condition and quantity of the lubricant.

23 Claims, 32 Drawing Figures

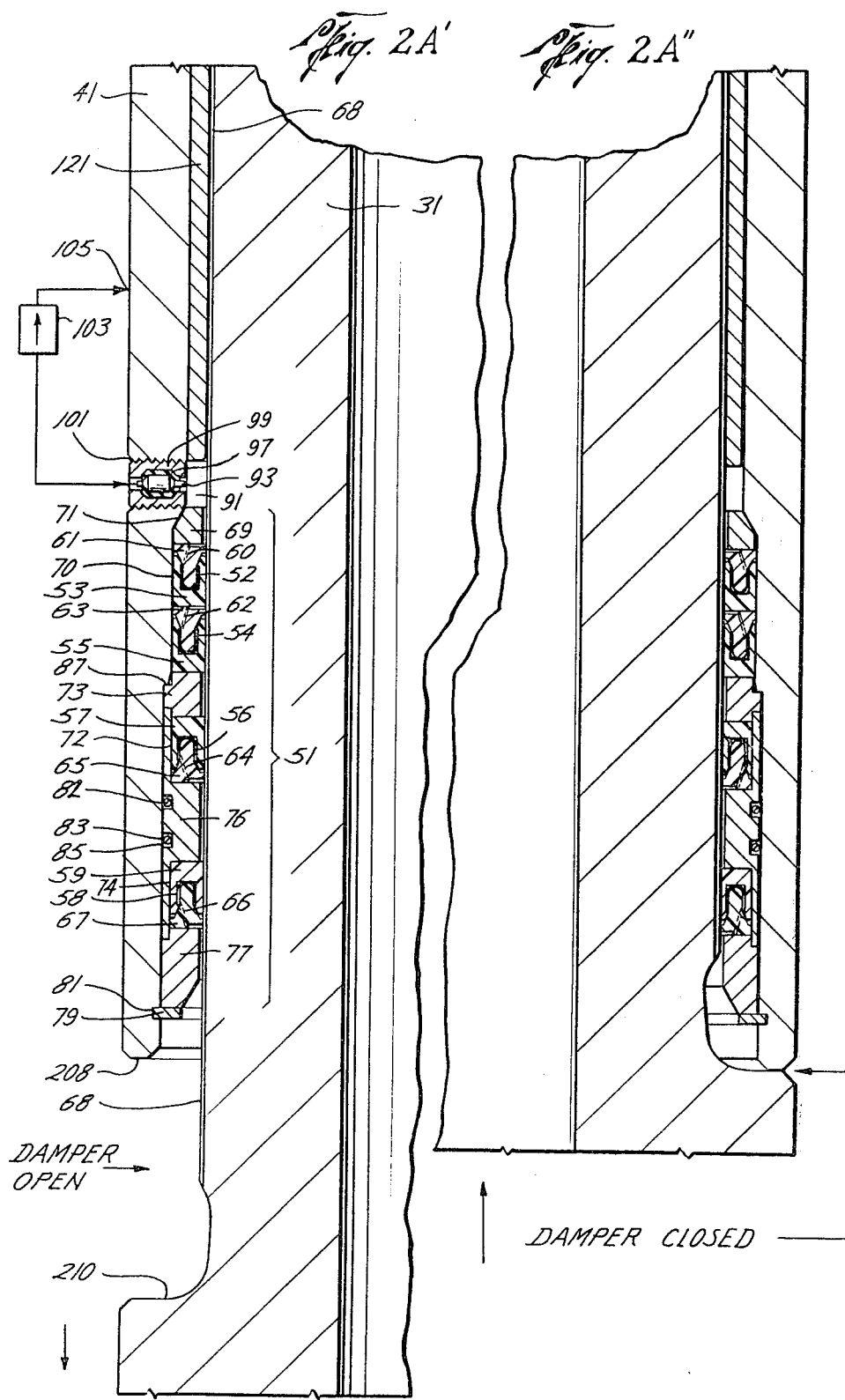

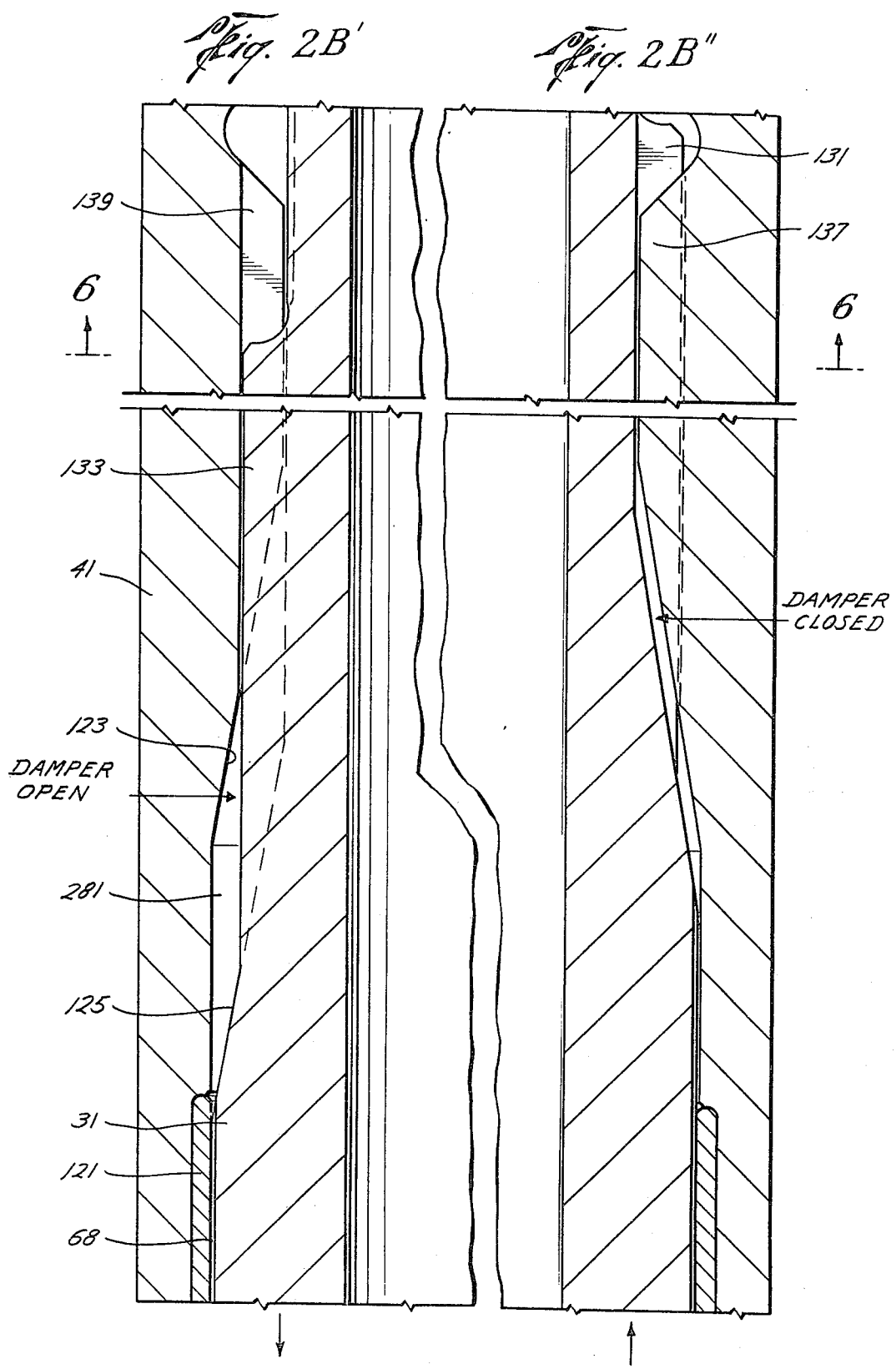

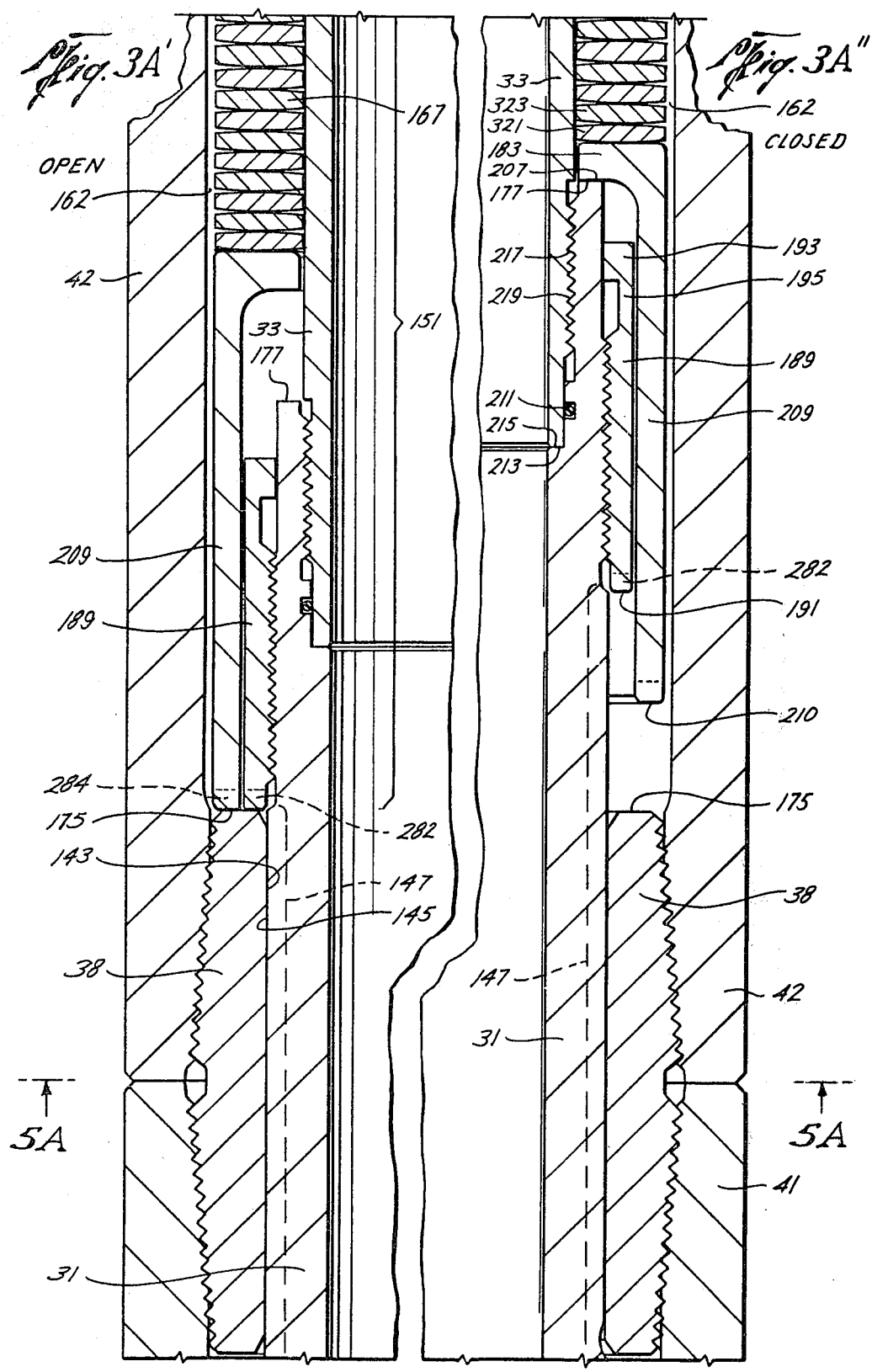

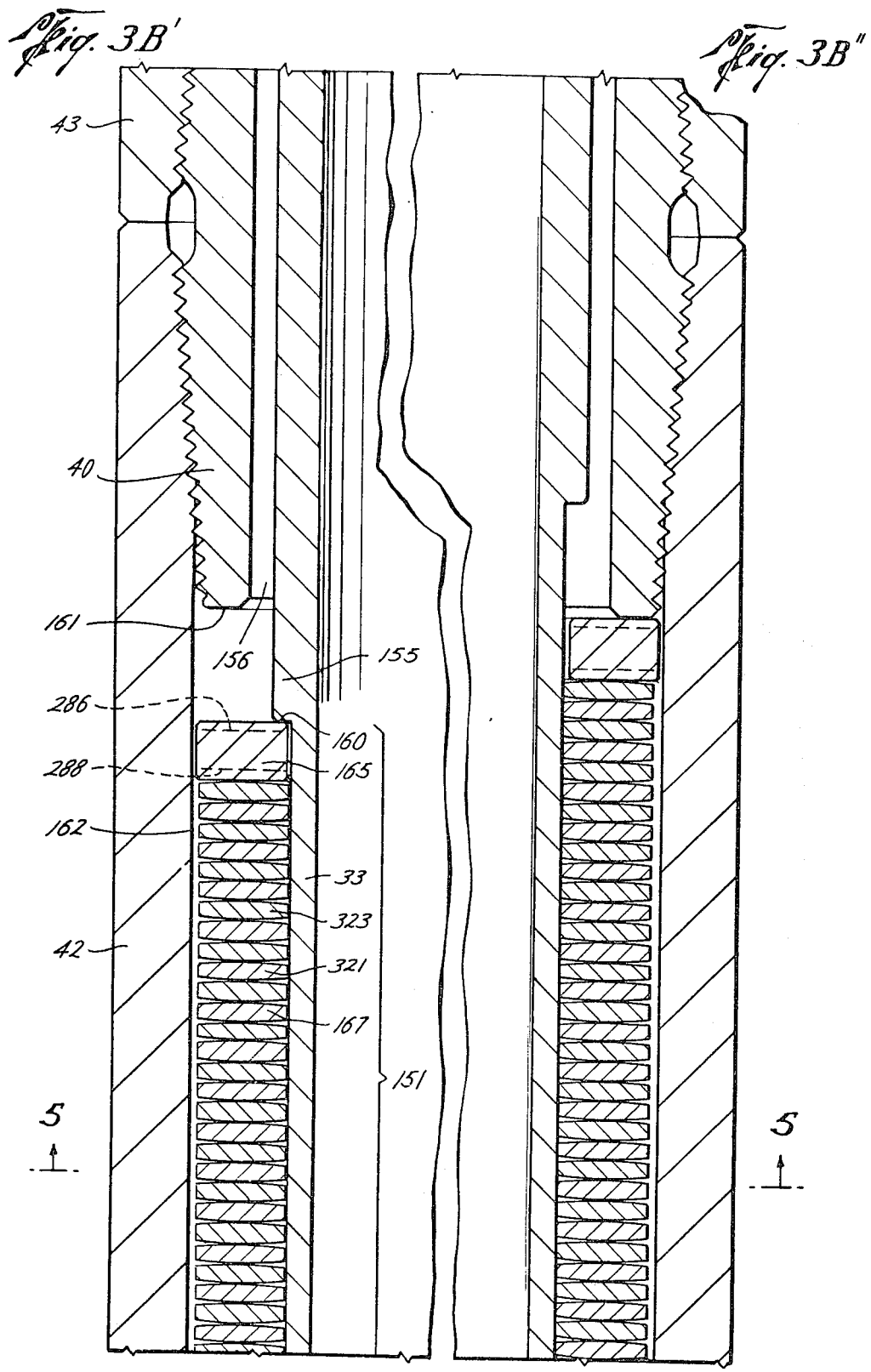

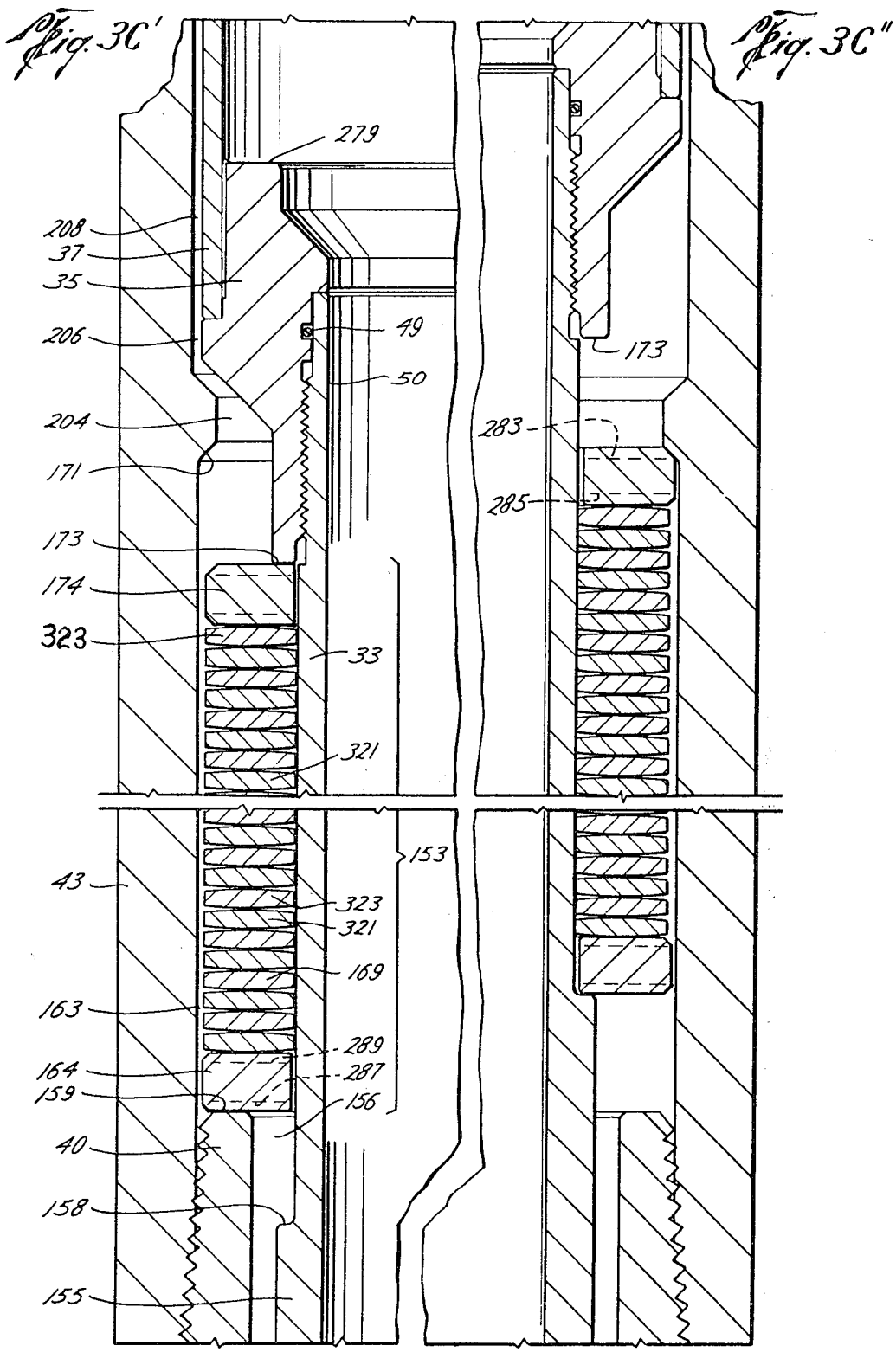

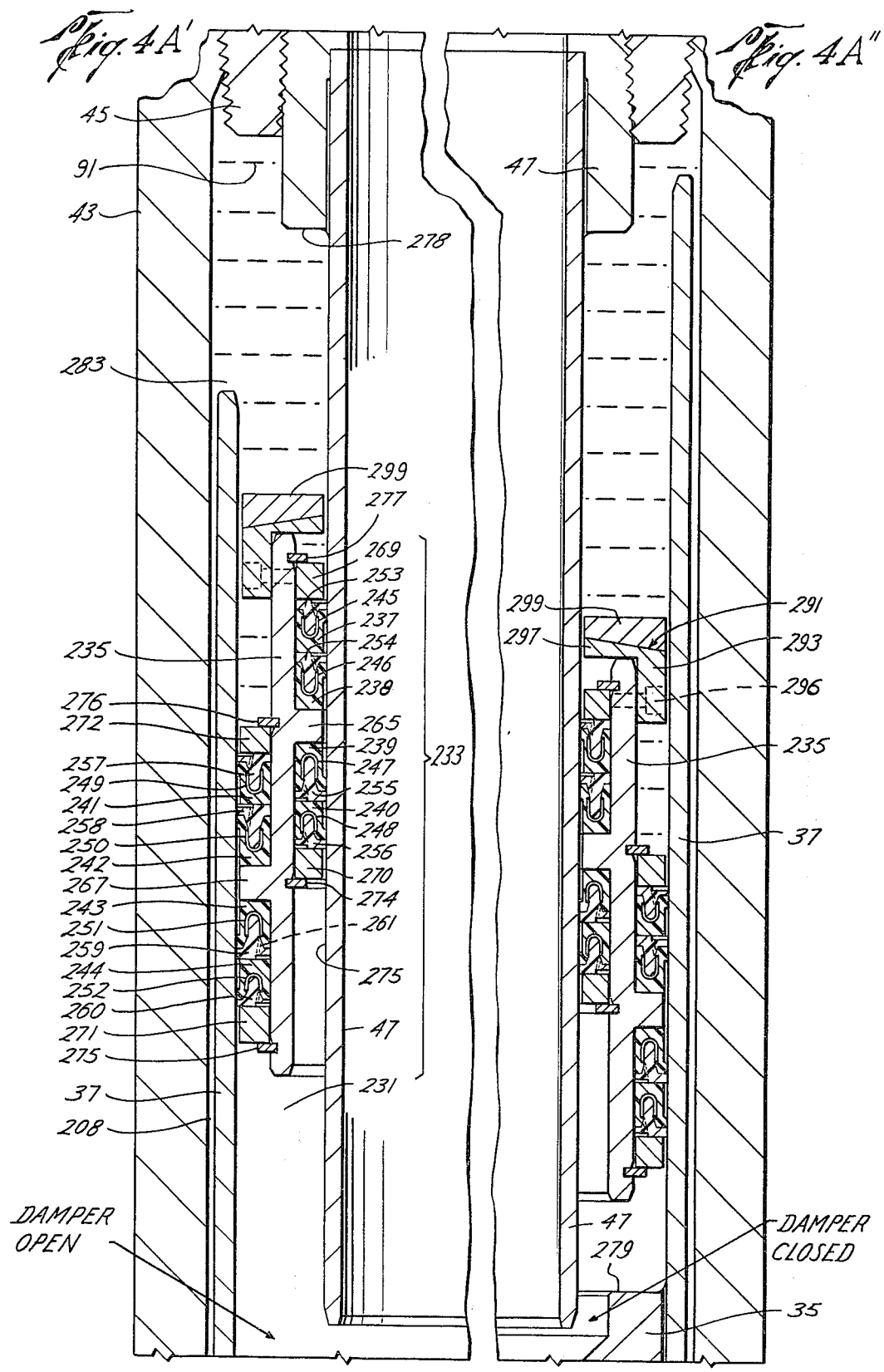

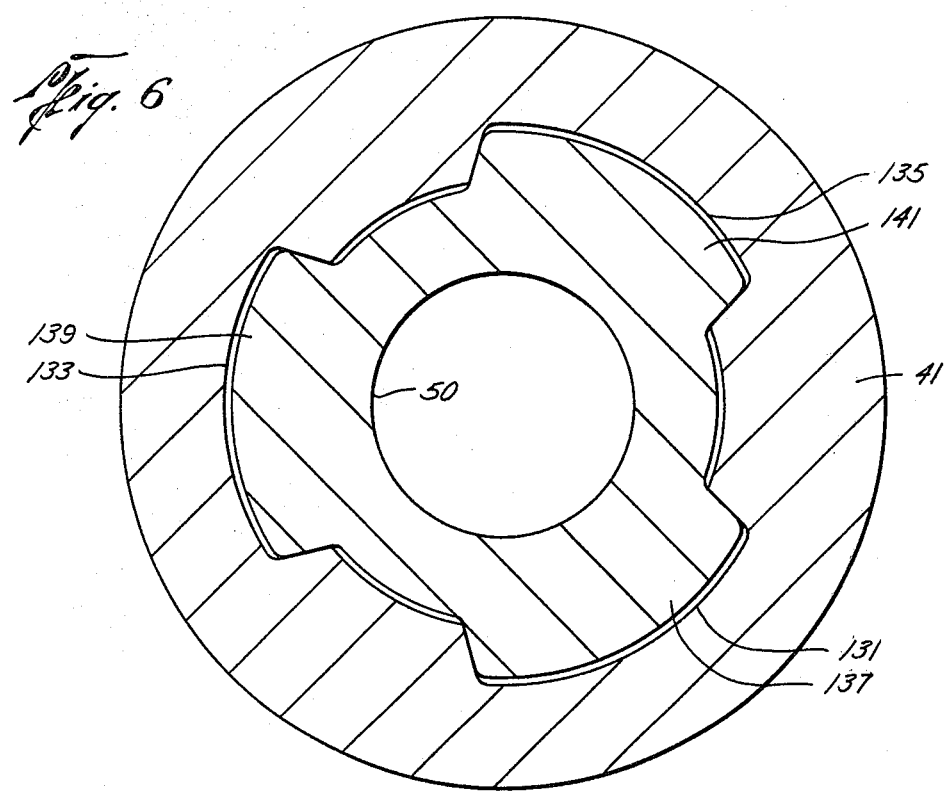
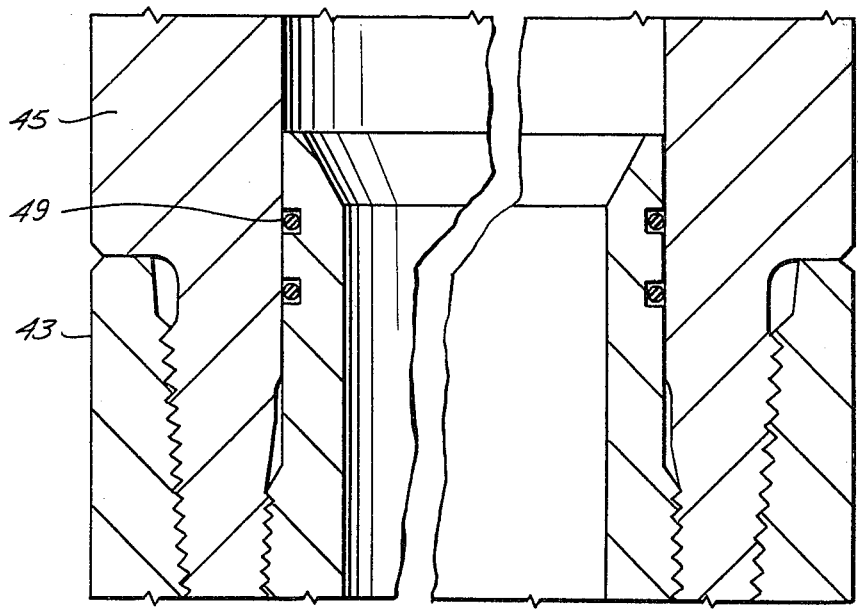

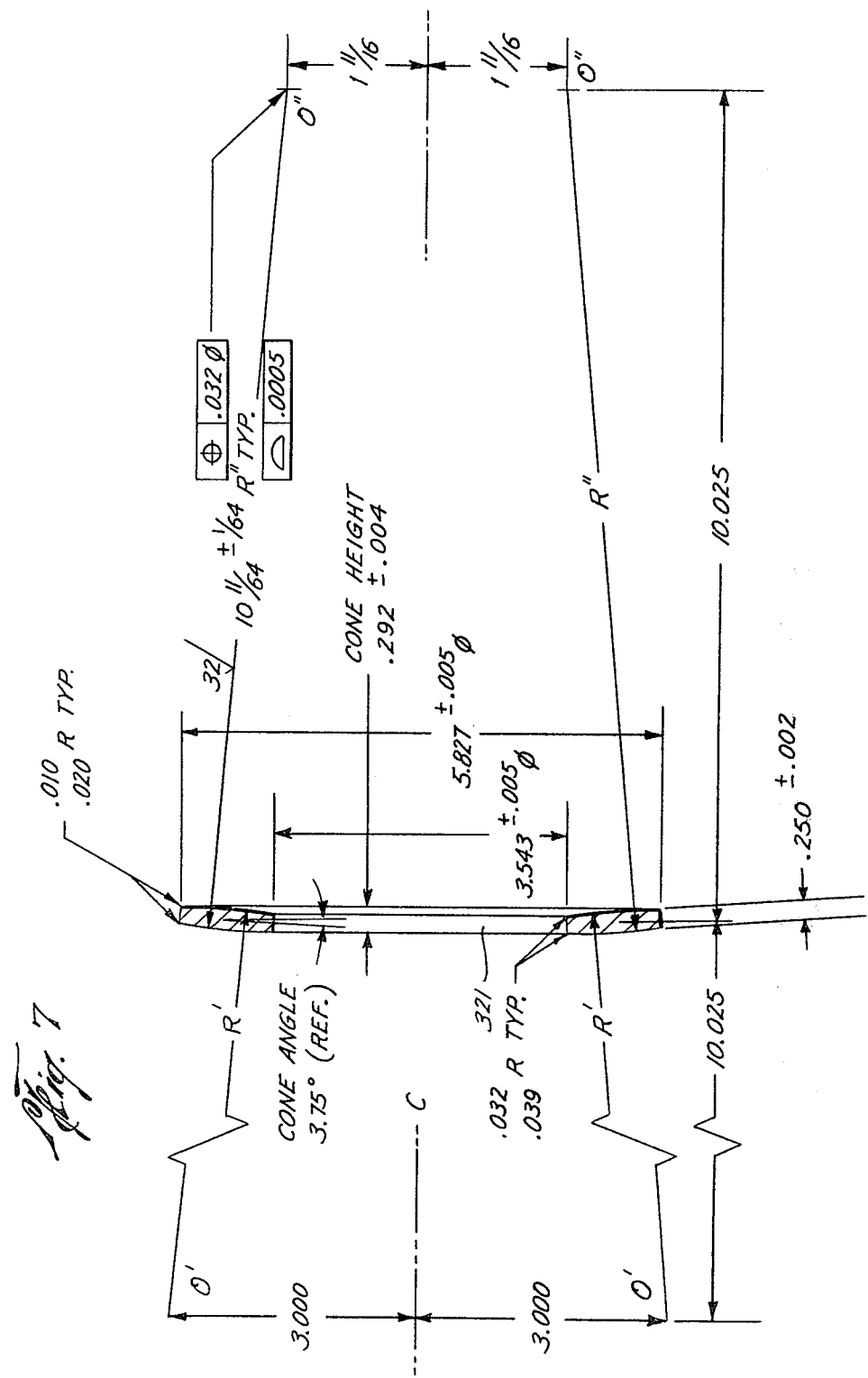

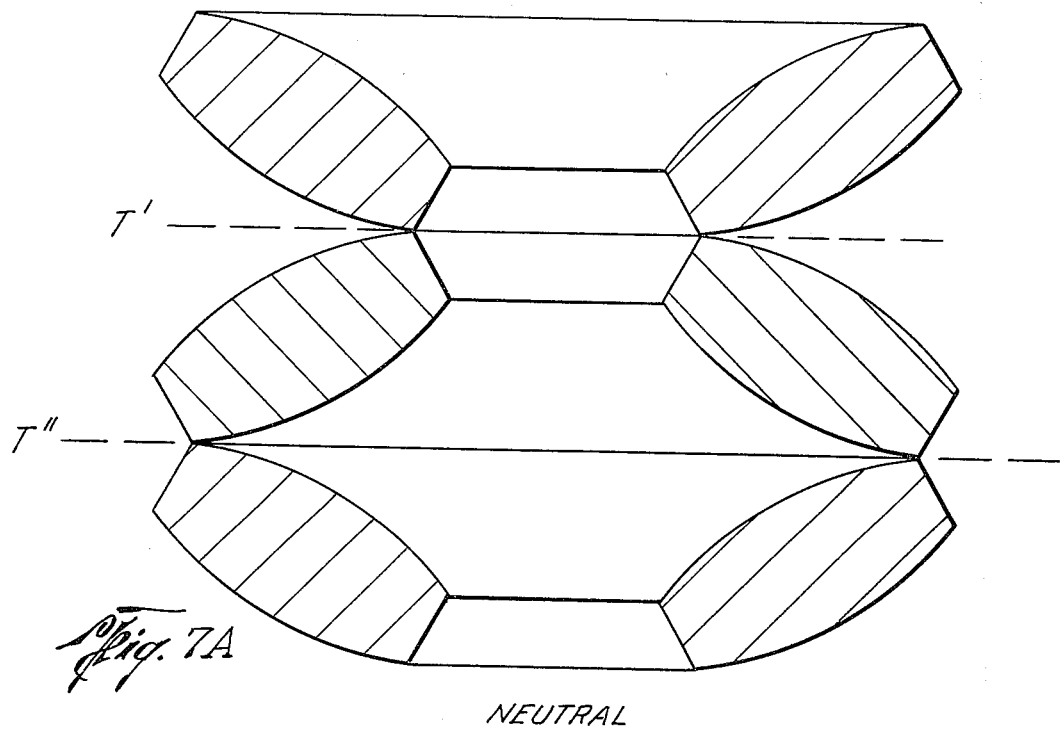
Fig. 7A  NEUTRAL
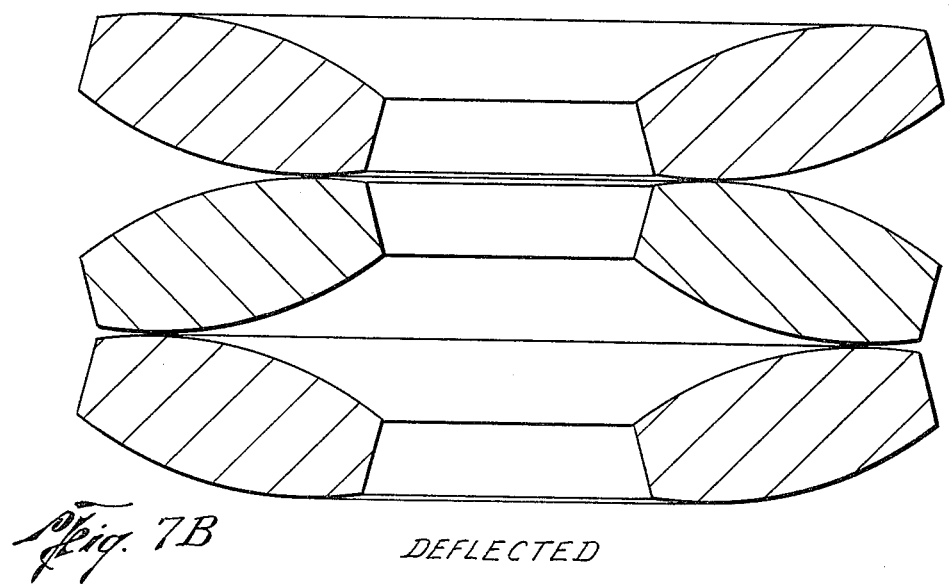
Fig. 7B  DEFLECTED

BELLEVILLE SPRING

VARIABLE MOMENT
BELLEVILLE SPRING

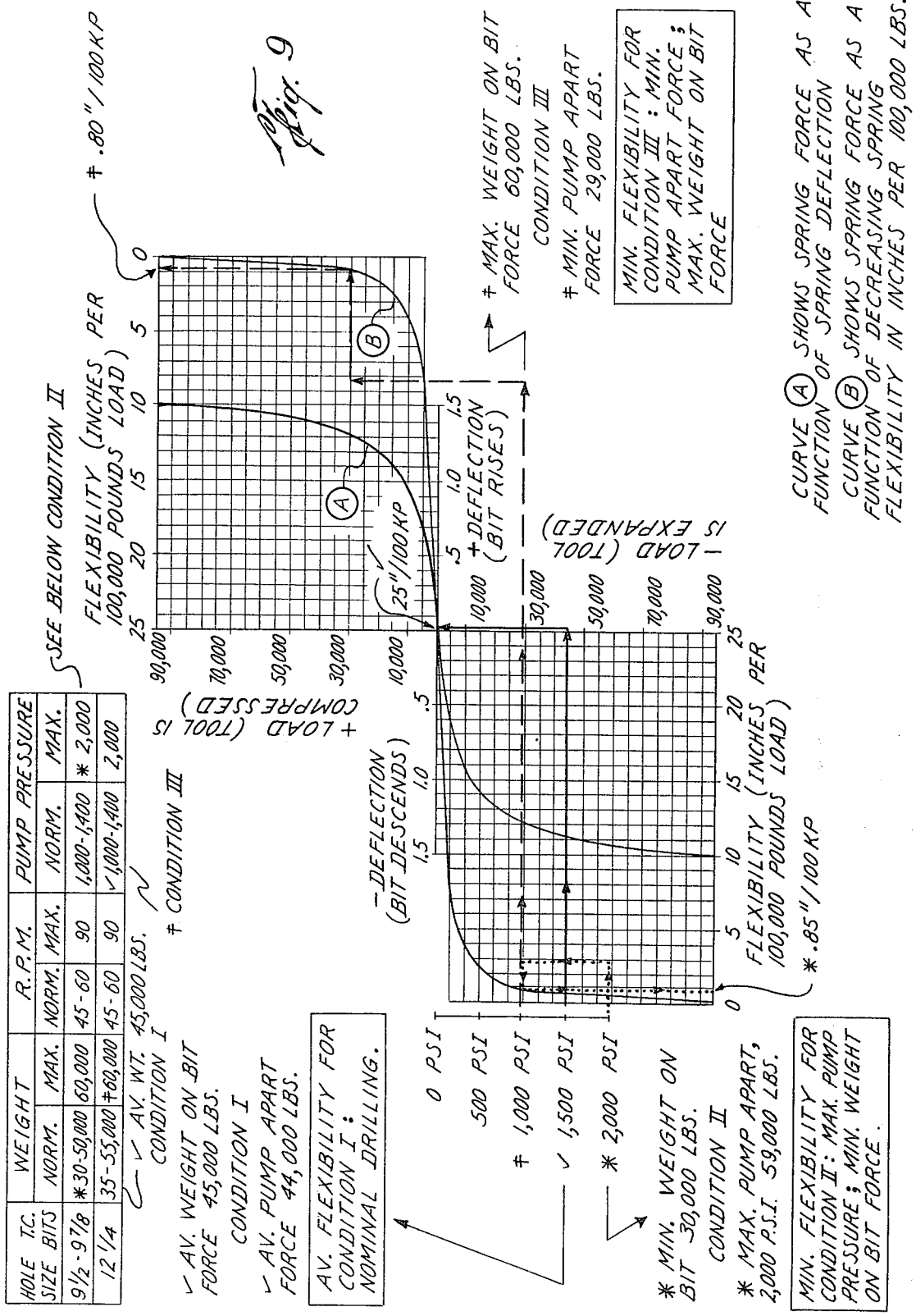

TRANSMISSIBILITY VERSUS FREQUENCY RATIO FOR VARIOUS DAMPING FACTORS

TWO 40 CONE STACKS IN PARALLEL

ROLLER BELLEVILLE SPRING DAMPER

CROSS REFERENCE TO RELATED APPLICATION

This application relates to an improvement upon the invention set forth in the United States patent application of William R. Garret, filed contemporaneously herewith, entitled DRILL STRING SPLINED RESILIENT TUBULAR TELESCOPIC JOINT FOR BALANCED LOAD DRILLING OF DEEP HOLES, Ser. No. 38,674, filed 5-14-1979, the disclosure of which is incorporated herein by reference.

TABLE OF CONTENTS

Cross Reference To Related Application
Background of the Invention
  1. Field of the Invention
  2. Description of the Prior Art
Summary of the Invention
Brief Description of the Drawings
Description of Preferred Embodiments
  Damper
  Pressure Seal
  Test Probe
  Lower Bearing Means
  Spline
  Upper Bearing Means
  Resilient Means
  Neutral Position
  Travel Limits
  Pressure-Volume Compensation Means
  Lubricant Space
  Motion of Floating Seal
  Seal Position Indicator
  Springs
  Variable Moment Belleville Springs
  Roller Belleville Springs
  Spring Clearance and Guidance
  Variable Spring Modulus
  Double Action
  Balanced Load Drilling
  Stroke
  Comparison
  Constant Bit Load Drilling
  Roller Belleville Spring Damper
Claims

BACKGROUND OF THE INVENTION

1. Field of the Invention

This invention relates to a damper, and more particularly to a splined tubular telescopic, double acting resilient unit for incorporation in a drill string, next to the bit or higher up in the string, of a rotary drilling system for earth boring, e.g., petroleum well drilling.

2. Description of the Prior Art

The prior art is discussed at length in the aforementioned Garrett application, including art relating to double acting dampers, variable spring rate dampers, sealed lubricated spring-spline-bearing means, floating seals, parallel spring means, double acting springs, elastomer-metal sandwich springs and Belleville springs.

A form of variable lever arm Belleville spring per se, of the general type employed in the present invention, is disclosed in U.S. Pat. No. 2,675,225—Migny. However Migny does not appear to disclose the concept of roller Belleville springs, only variable moment, i.e. variable lever arm, Belleville springs.

In one embodiment Migny shows only a single Belleville washer which is double convex in cross-section and is disposed between two flat plates. As load is imposed on the plates, the washer initially pivots about its upper inner edge and its lower outer edge as do ordinary Belleville springs, with a resultant linear force deflection curve, but as the washer flattens the washer's edges leave contact with the plates and force is transmitted to the washer through body areas inward of the edges, decreasing the lever arm and causing the force-deflection curve to become non-linear.

The initial pivoting of the Migny washer is of course not a rolling action but a pivot or hinge type action. Even when the washer turns so that its edges are out of contact with the plates, the washer does not roll on the plates but instead slides relative thereto, because the curvature of the washer faces is different from that of the plates, because the plates do not expand under load the same as the washers, and because the curvature of the bottom of each washer apparently differs from that of the top of each washer.

In another embodiment Migny discloses a stack of groups of Belleville spring washers. The groups are in series and the washers in each group are in parallel. The conical abutting surfaces of the paralleled washers in each group slide relative to each other as load is applied. Only the outer faces of the uppermost and lowermost washers in each group have convex sections. The latter washers may initially pivot relative to each other as does the washer of the first mentioned embodiment, and thereafter it is uncertain what the relative motion of the washers may be, for although such motion is described as being a "rocking" motion, the convex cross-section surfaces of the springs are said to be curved like the washers of the first described embodiment and the drawing appears to show different curvature on different washers.

At least it can be said that Migny does not discuss rolling or the conditions required to effect rolling of variable moment Belleville springs.

Early forms of drill string dampers are exemplified by patents such as German No. 631398 (1936)—Prussiche, U.S. Pat. No. 2,991,935—Warren, wherein a splined tubular telescopic joint is provided with a helical spring means urging the joint to extended position. These are single acting dampers, in that in the unstrained or neutral position of the damper, only contraction is possible, it being intended that in use the static load on the damper will compress the spring approximately half way, thereby to allow for resilient motion in both directions when the bit moves up and down.

For various reasons it has been disclosed that a variable modulus spring should be employed in a drill string damper. In this regard see U.S. Pat. Nos. 3,381,126—Salvatori; 3,409,537—Falkner; 3,871,193—Young; 3,949,150—Mason.

The foregoing patents showing variable modulus dampers relate to single acting dampers. It may be assumed that these dampers, like other single acting dampers, are intended to operate about a static deflection point near the mid-range of the load-deflection curve. In this regard, note the Mason patent wherein operation with a static load of 25,000 lb/in is described (col. 10, l. 63) with respect to a preferred variable spring rate curve as shown in the shaded area in FIG. 15 of the patent (col. 10, l. 6–10).

The dampers of the foregoing patents do not appear to gain much benefit from their variable modulus springs. At the intended static deflection point the spring rate is well above the low spring rate which exists at low deflection. If such a damper is operated at or near balanced load condition (drilling weight equals pump apart force), where the static deflection is zero or low, the damper will bang against its travel limit stop on alternate half cycles of vibration. Even when operating at the middle of the load-deflection curve, such a damper may bang its expansion limit stop, since as in any single acting damper there is no spring opposition to extension of the damper from its partially contracted condition; in fact, the spring assists the extension.

Some account of the foregoing problem is taken in the damper disclosed in U.S. Pat. No. 4,139,994—Alther, wherein an additional spring element is provided for reverse loading. However the reverse load spring element is operative only when the bit is off bottom or the bit is lightly loaded, and has a much shorter stroke than the direct loading spring element. As stated in the brochure of Drilco Industrial entitled "Shock Sub" with reference to a commercial embodiment of the Alther damper:

"A second smaller elastmeric element is provided to cushion reverse loading during severe rebounds or when pulling from the hole."

In the aforementioned copending application of William R. Garrett there is disclosed a drill string damper which is especially constructed for balanced load drilling wherein the drilling weight and pump apart force are substantially equal, the damper including resilient means that is strained equally by like axial displacements of the spring means from the neutral or unstrained position in the direction of extension and the direction of contraction of the damper. The resilient means has a low spring modulus at positions near the neutral position and a higher modulus at positions farther from the neutral position. With this construction, the damper can operate at the very low modulus range of the spring means over an expected travel range, but will convert to a high modulus damper at each end of the stroke to prevent banging against the travel stops.

As set forth in the Garrett application, it was originally conceived that such a double acting variable modulus damper might employ as the spring means a stack of annular pads of felted steel wire, or a stack of elastomer-metal washer sandwiches, or a stack of Belleville springs. All of such spring elements have various drawbacks. Wire pads have high internal friction and tend to crush and lose their resiliency when overstressed or fatigued; elastomer-metal sandwiches are subject to rapid deterioration in high temperature surroundings; ordinary Belleville springs, if designed to have a large variation in springs rate, will likely be stressed near or over the elastic limit, reducing their life expectancy.

None of the aforementioned all metal spring means has as wide a range of spring rates as is desirable. In this regard it is to be noted that an equation giving TR, the ratio between the magnitude of a transmitted vibratory force and an impressed vibratory force, is $$TR = [(1+(2zr)^2)/((1-r^2)^2+(2zr)^2)]^{\frac{1}{2}}$$

where r is the ratio of the impressed frequency to the natural frequency, and z is the damping factor. See eq. 2–87 on p. 72 and equation 2–41, on page 40 of the treatise entitled *Mechanical Vibrations* by Rolland T. Hinkle published 1963 by Allyn and Bacon, Inc. A curve plotting the relationship of TR and r, taken from FIG. 2.32 on page 73 of the aforementioned treatise, appears as FIG. 10 of the accompanying drawings. From the curve it will be seen that the least transmission of force occurs for damping means which have a ratio r larger than $(2)^{\frac{1}{2}}$ and which have the smallest possible damping factor z. Conversely, it will be seen that if the ratio r is less than $(2)^{\frac{1}{2}}$, there is a possibility of resonant vibration, unless the system is frictionally damped.

It may be assumed that in rotary drilling employing a three cone rock bit, the drill string rotating at 60 revolutions per minute, the impressed vibratory force as the bit moves past a rock or other high spot in the bottom of the hole is $(3) \times (60) = 180$ cpm or 3 cps. It is therefore desirable that the natural frequency of the system comprising the damper and drill stem thereabove be less than $3/(2)^{\frac{1}{2}} =$ circa 2 cps.

It is an object of the present invention to provide a damper which will be soft enough to provide a natural frequency as low as possible over a wide range of deflection, with a gradually, then rapidly, increasing spring stiffness to provide a cushioned stop at the ends of the damper stroke as defined by the travel limit stops. A further object of the invention is to provide such a damper which will have a long life even under high temperature conditions. Other objects and advantages of the invention will appear from the following description thereof.

SUMMARY OF THE INVENTION

According to the invention a double acting damper is provided by a resilient, splined, sealed, lubricated telescopic joint wherein the spring means comprises one or more paralleled double acting stacks of series stacked variable lever arm Belleville spring washers shaped to provide pure rolling between washers. The washers, have upper and lower surfaces that are curved in such a manner that in combination with the other parameters (initial cone angle, height-thickness ratio and outer to inner diameter ratio) there results a damper having a very low spring rate over a large percentage of the damper stroke, with a gradually, then rapidly, increasing spring rate approaching the ends of the stroke, while at the same time the tensile stress in each disc remains below that corresponding to the desired endurance limit, e.g. 20,000 psi for steel for near infinite endurance without fatigue.

Preferably there results a damper which in combination with expected drill string masses will result in a system having a natural frequency of around 2 cps or less. this regard it is to be noted that the natural frequency $f_n$ is determined by the formula:

$$f_n = (kg/w)^{\frac{1}{2}}/2 \text{ pi}$$

where k is the spring rate, g is the acceleration of gravity and w is the weight. In other words, the greater the weight, the lower the natural frequency. In deep holes, where the drill string is long and of great weight, the natural frequency is very low and resonant vibration is not a serious problem. On the other hand, in shallow holes, where the natural frequency is higher due to the low weight of drill stem, the formation being bored is usually softer, so there is a lower amplitude of impressed force on the bit. Therefore, it may be expected that problems of resonant vibration will be more likely to occur at depths of a few thousand feet.

Assume for example, a drill stem length of one thousand feet above the damper; a substantial part of this, perhaps several hundred feet, will be represented by drill collars. The mass of such drill stem portion may therefore be of the order of thirty two thousand pounds. Using the foregoing equation for the natural frequency, assumed to be 2 cps, and solving for k, the spring rate, we have $$2 = (kg/32000)^{1/2}/2\pi$$

$$(4\pi)^2 = k(32/32000) = k/1000$$

$$k = (16)(\pi)^2(1000) \text{ lb/ft} = \text{about } 13,000 \text{ lb./in.}$$

which is a very low spring rate. Such a rate is achieved and surpassed according to the invention. At the same time, at the travel limit, a rate of the order of 280,000 lb. per in. is obtained.

A further advantage of the invention is the reduction of friction in the damper. While friction tends to damp out resonant or near resonant vibrations, i.e., when the ratio r is less than $(2)^{\frac{1}{2}}$, for ratios of impressed to natural frequency above $(2)^{\frac{1}{2}}$ friction promotes transmission of vibrations and therefore is detrimental. The damper of the present invention has a low friction due to the combination of the particular spring means, its mounting, its sealing means (Teflon), and its lubrication.

A further advantage of the invention is its adaptability to use under high ambient temperature conditions, all spring parts being metallic, e.g., spring steel or beryllium copper.

BRIEF DESCRIPTION OF THE DRAWINGS

For a description of a preferred embodiment of the invention, reference will now be made to the accompanying scale drawings, the elevational and cross-sectional views showing that the parts are made of metal, e.g. steel, except as otherwise indicated, e.g. the seals are preferably made of Teflon or a high temperature stable, oil and water resistant elastomeric material.

FIGS. 2A' and 2B', together hereinafter referred to as FIG. 2', are fragmentary sectional views to a larger scale showing the pressure seal, bearing and spline at the lower end of the damper, with the damper in the open or extended position;

FIGS. 2A" and 2B" together hereinafter referred to as FIG. 2", are fragmentary sectional views similar to FIG. 2' showing the lower end of the damper in the closed or contracted position;

FIGS. 2' and 2" are drawn with a common center line for easy comparison and may be referred to together as FIG. 2;

FIGS. 3A', 3B', and 3C', together hereinafter referred to as FIG. 3', are fragmentary sectional views, also to a larger scale than FIG. 1, showing the resilient unit at the medial portion of the damper in its open or extended position, FIGS. 3A", 3B", and 3C", together hereinafter referred to as FIG. 3", are fragmentary sectional views, similar to FIG. 3', showing the medial portion of the damper in the closed or contracted position, FIGS. 3' and 3" are drawn with a common center line for easy comparison and these figures taken together may be hereinafter referred to as FIG. 3;

FIGS. 4A' and 4B', together hereinafter referred to as FIG. 4', are fragmentary sectional views, also to a larger scale than FIG. 1, showing the pressure volume compenating floating seal at the upper end of the damper in the open or extended position;

FIGS. 4A" and 4B", together hereinafter referred to as FIG. 4", are views similar to FIGS. 4A' and 4B', showing the upper end of the damper in the closed or contracted position;

FIGS. 4' and 4" are drawn with a common center line for easy comparison and may be referred to together as FIG. 4;

FIGS. 5, 5A and 6 are respectively sections taken at planes 5—5, 5A—5A, and 6—6 of FIGS. 3 and 2';

FIG. 7 is a sectional view of one of the roller Belleville spring elements;

FIGS. 7A, 7B, 7C, 7D, 7E, and 7F are schemetic sectional views of stacks of various Belleville springs, and FIGS. 8, 9, 9A, 10 and 11 are graphs.

DESCRIPTION OF PREFERRED EMBODIMENTS

Damper

Figure 1:
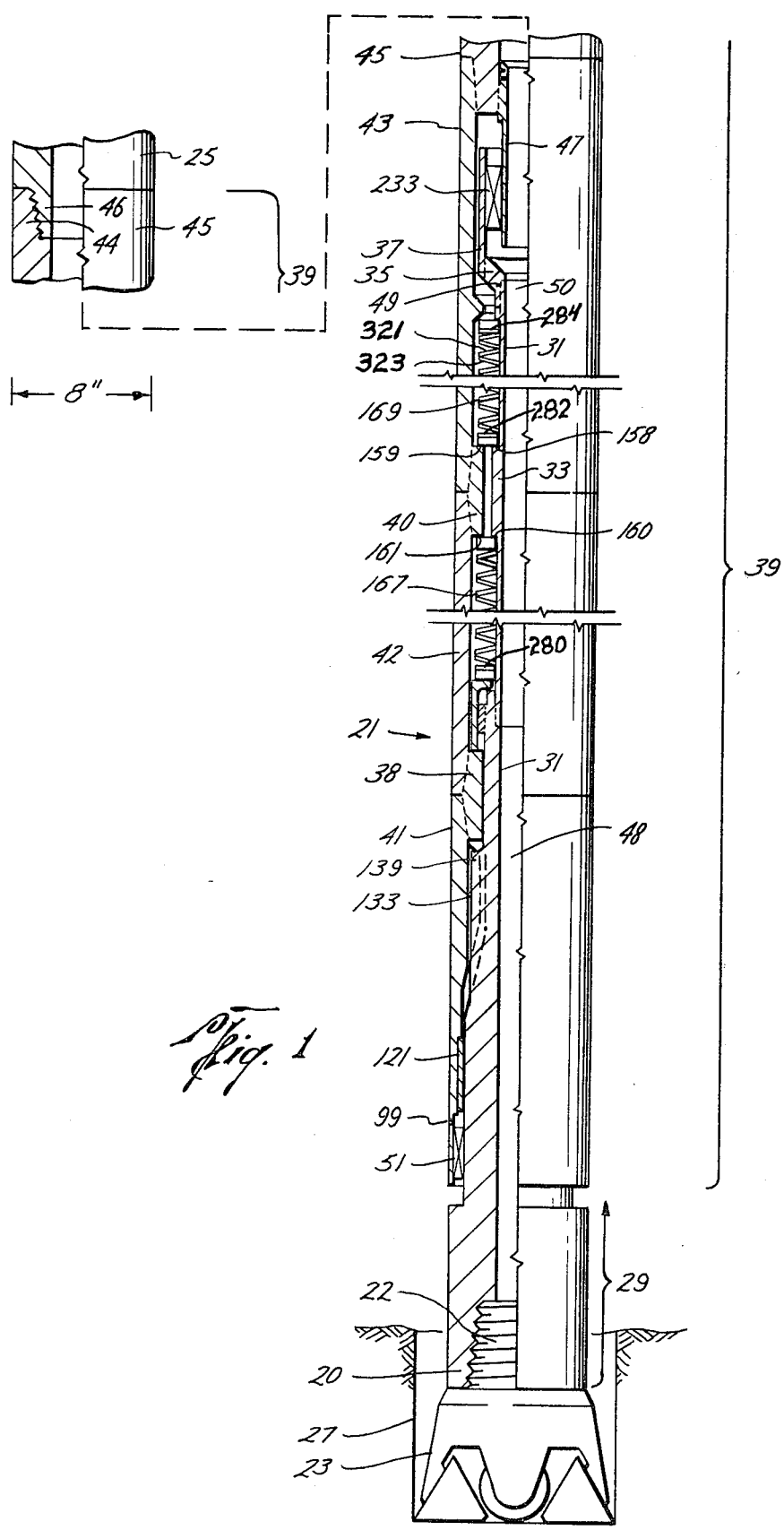
FIG. 1 is an elevation, partly in section, showing a damper according to the invention assembled in the lower end of a drill string, with the spring means in the neutral or unloaded position.

Referring now to the drawings and in particular to FIG. 1, there is shown a damper 21 connected at its lower end to a three cone drill bit 23 and at its upper end to another lower drill string member 25 such as a stabilizer or drill collar. Although the drawing shows the damper directly above the bit, it may be employed at other places in the drill string, preferably however where most of the weight slacked off in the drill string is above the damper. The apparatus is shown in a well bore 27 being drilled by bit 23 by the rotary system of drilling. The damper includes a tubular mandrel identified generally by reference number 29. The mandrel comprises a lower seal and bearing and spline portion 31, a medial spring portion 33, a cross over sub portion 35, and an upper compensator portion 37. Mandrel portions 31, 33, and 35 are connected by rotary shouldered taper threaded connections, such connections being more fully described in U.S. Pat. No. 3,754,609—Garrett. Mandrel portion 37 is shrink fitted to mandrel portion 35.

Mandrel 29 works telescopically within and about a tubular barrel indicated generally by reference character 39. The barrel includes a lower seal and bearing and spline portion 41, medial spring portions 42, 43, an upper cross over sub 45, and a depending compensator portion 47. Barrel portions 41, 42, 43, are connected by double tapered threaded buried pins 38, 40, screwed into correlative boxes in the barrel portions, similar to rotary shouldered connections, and barrel portions 43, 45 are connected together by rotary shouldered connections as above referenced. Barrel portions 45, 47 are connected together by a taper thread and are sealed by an O ring 49.

The connections between the damper and drill bit and between damper and the upper part of the drill string are also rotary shouldered connections. Such connections each comprise a pin and box connector and either type of connector may be provided at each end of the damper depending on what type of use is to be made of the damper. As shown, a box connector 20 is provided at the lower end of the damper for connection with a drill bit pin 22, and at the upper end of the damper there is a box connector 44 for connection with a pin 46 on lower drill string member 25.

Passage means through the damper for conveying drilling fluid from lower drill string member 25 to drill bit 23 include central passages 48, 50 through tubular mandrel portions 31, 33.

Referring now to FIG. 2, there is shown most of the lower portion of the damper, forming the seal, bearing and spline part thereof. This includes portions 31, 41 of the mandrel and barrel.

Pressure Seal

At the lowermost part of the damper there is pressure seal means 51 disposed between the barrel and mandrel portions 31, 41. Seal means 51 comprises a plurality of double lip seal rings 53, 55, 57, 59. Seal rings 53, 55 face upwardly; seal rings 57, 59 face downwardly. The seal rings are preferably made of Teflon or other low friction coefficient, high temperature resistant, flexible resilient, sealing material. The lips of the seal rings are preloaded to move away from each other by corrosion resistant metal springs such as those indicated at 52, 54, 56, 58.

Metal wedge rings 61, 63, 65, 67 also hold apart the lips of the seal rings to assist them in moving into sealing engagement with low friction coefficient hard metal finished surface 68 at the cylindrical outer periphery of mandrel portion 31 and the finished surfaces 70, 72, 74 at the cylindrical inner periphery of barrel portion 41 and the cylindrical upper and lower inner peripheral portions of spacer ring 76. Weep holes 60, 62, 64, 66 equalize fluid pressure on opposite sides of the rings. The wedge rings have tongues extending to the bottoms of the annular spaces between the seal ring lips to transmit force through the bottoms of the seal rings when axial force is imposed on the wedge rings. Although as noted above, the wedge rings spread apart the lips of the seal rings, their function of transmitting force through the bottoms of the rings is their primary function, thus permitting stacking of the seal rings, as in the case of rings 53, 55. In addition, the flat surface of the uppermost wedge ring 61 facilitates retention of the seal rings in the barrel underneath steel retainer ring 69. Ring 69 is beveled and rests against bevel shoulder 71 in the barrel.

The force of the fluid pressure in the damper acting down on seal rings 53, 55 is transferred by end ring 73 through support ring 76 to end ring 77 and thence to snap ring 79, received in annular groove 81 in the lower end of the barrel.

Support ring 76 is sealed to the barrel by O rings 82, 83 received in annular grooves around the support ring. The O rings are in slight compression between the bottoms of the grooves and barrel surface 85. Support ring 76 is held fixed in the barrel between end rings 73, 77, which are captured between snap ring 79 and a shoulder 87 at the juncture of upper seal surface 70 and larger diameter lower seal surface 85. Therefore O rings are suitable for the non sliding seal between the barrel and support ring 76. This is in contrast to the seals effected by seal rings 53, 55, 57, 59 with the mandrel, which are axially sliding seals.

Support ring 76 not only transfers load from the upper seal rings to snap ring 81 but also provides a cartridge independently supporting seal rings 53, 55 so that load is not transferred from one through the other as in the case of the uppermost seal rings 53, 55, thereby insuring that the lip seal action of each ring remains unimparied. A similar cartridge construction could be used for the upper two seal rings if desired. Or if preferred, the lower seal rings 57, 59 could be stacked with only a wedge ring in between as in the case of the upper seal rings.

The lower seal rings 57, 59 seal primarily against upwardly directed fluid pressure from the fluid outside the damper. The force of the pressure is transferred to shoulder 87 through end ring 73 in the case of seal 57 and through support ring 76 and end ring 73 in the case of seal ring 59. No force of pressure fluid is intended to be transferred from end ring 77 to wedge ring 66, nor from support ring 76 to wedge ring 65.

Test Probe

As will appear more clearly hereinafter, although seal means 51 seals against the pressure of fluid both in the well bore outside the damper and in the drill string connected to the damper, seal means 51 is exposed to drilling fluid only on its lower side. Above seal means 51 in the space between the barrel and mandrel there is a clean lubricating oil 91 extending all the way up to the compensator portions of the barrel and mandrel. Within this clean fluid work the spline and resilient means later to be described. It is important for the user to know if any of the damper seals has failed. If such failure causes an influx of drilling fluid, the lubricating fluid will become contaminated by the drilling fluid, e.g. with water.

Figure 1A:
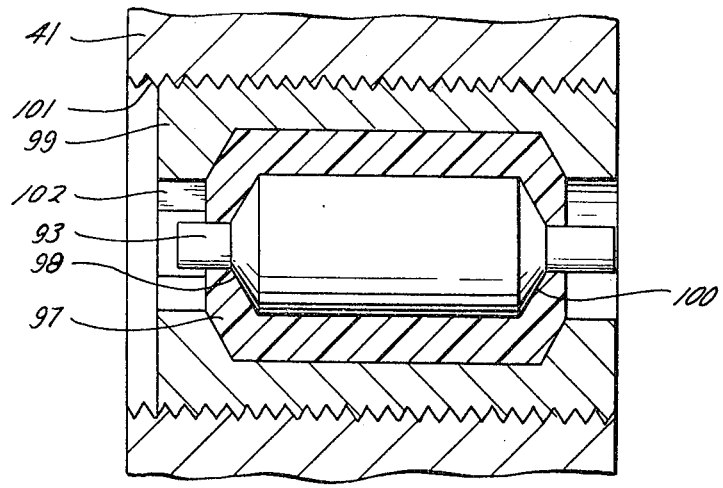
FIG. 1A is a detail, to a larger scale, showing the electrical test probe of the damper.

Referring now particularly to FIGS. 1, 1A, and 2A', to detect such a change there is provided in the barrel just above lower seal means 51 a test probe comprising an electrically conductive (metal e.g. brass) electrode 93 extending through the barrel wall. The electrode is surrounded on its outer periphery by and bonded and sealed to electrically insulating sleeve 97 which in turn is mounted in and bonded and sealed to screw plug 99 which the closure for a lubricant injection and drainage port provided by threaded hole 101 in the barrel wall. The plug is screwed into the port. To prevent the electrode from moving axially under the pressure differential between the interior and exterior of the barrel, the electrode is made of larger diameter at its mid portion than at its ends, leaving tapered shoulders 98, 100 adjacent each end. An annular recess in the screw plug is shaped correlative to the exterior of the electrode forming shoulders at each and of the recess facing toward the shoulders on the electrode. The insulation sleeve is captured at each end beteen the plug and electrode shoulders and resists relative motion of the electrode and plug. The outer diameter of the mid portion of the electrode is too big to pass through the recess in the plug at the outer end thereof. A material suitable for the insulation sleeve is one which can withstand pressure differential and well fluids such as a plastics material, e.g. epoxy. At its outer end, the recess in plug 99 is formed as a wrench socket 102 to facilitate assembly and disassembly.

By connecting an ohmmeter 103 between the outer end of the electrode and a point such as 105 on the exterior of the barrel, the electrical resistance of the oil 91 can be measured to determine its character, i.e. whether or not it has become contaminated. If so, the damper seals and lubricant need to be checked for replacement and then replaced to the extent required.

It may be noted that whereas the lubricating oil has a high resistivity, most drilling fluids have a low resistivity. Furthermore, the drilling fluid will usually be denser than the oil and will sink to the bottom of the space normally occupied by the oil. That is why the test probe is placed at the lowermost part of such space, just above lower seal means 51. At that point, the test probe will contact any such drilling fluid and the resistance test will show a low resistance path through such drilling fluid.

Lower Bearing Means

Still referring to FIG. 2, above plug 99, the interior of barrel portion 41 is provided with a replaceable bushing or liner 121 made of a wear resisting, low friction coefficient, corrosion resistant bearing material compatible with hard facing material 68 on mandrel 31. For example, liner 121 may be made of beryllium copper or aluminum bronze or the equivalent. The bushing has a smooth cylindrical inner surface which cooperates with a continuation of surface 68 on the exterior of the mandrel to provide bearing means. The bearing means transmits bending moment between mandrel and barrel while providing for relative axial motion therebetween. To provide maximum area for taking bending moment, flutes 147 are made deeper than they are wide.

Spline

Above the bearing means just described, the wall of barrel portion 41 thickens by a reduction in its inner diameter, and there is a correlative thinning of the wall of mandrel portion 31 by a reduction in its outer diameter. Conical surfaces 123, 125 are formed where these transitions occur.

Referring now also to FIG. 6, the interior of the thick walled part of barrel portion 41 is fluted parallel to the barrel axis, forming three vertical grooves 131, 133, 135. The mandrel at this level is provided with three splines 137, 139, 141 which fit into the grooves and cooperate therewith to provide spline means for transmitting torque between the barrel and mandrel while providing for relative axial motion. While a spline can be made to transmit bending moment, e.g. by having the spline bottom in the grooves, the spline means here disclosed is intended primarily for transmission of torque through the side walls of the splines and grooves, the walls having large radial components. However some transmission of bending moment will also be provided by the spline means due to the circumferential components of the side walls of the splines and grooves. Each spline side wall may, for example, make an angle of e.g. 15° to 45° with the radial plane therethrough, FIG. 6 showing a representative desirable angle.

Upper Bearing Means

Above the spline, just described, the inner periphery 143 of buried pin 38 is in sliding contact with the outer periphery 145 of mandrel portion 31, thus providing an upper guide bearing. The upper and lower guide bearings, being spaced apart axially, can take considerable bending moment without being overloaded. The outer periphery of mandrel 31 is fluted at 147, providing fluid passages for lubricating oil 91, as will be explained in more detail hereinafter.

Resilient Means

Referring now to FIG. 3, there is shown the medial portion of the damper including the resilient means therof comprising mandrel portion 33 and barrel portions 42, 43 with spring means 151, 153 therebetween. Mandrel portion 33 has an outturned flange 155 (FIG. 3B', 3C') therearound and buried pin 40 between barrel portions 43 forms in effect an inturned flange within the barrel. These flanges provide upwardly facing annular shoulders 158, 159 and downwardly facing annular shoulders 160, 161. These shoulders define the inner ends of annular pockets 162, 163 between mandrel portion 33 and barrel portions 42, 43. At the inner ends of these pockets are pressure rings 164, 165 engaged respectively with the ends of spring stacks 167, 169 and engageable with shoulders 158-161.

The upper end of pocket 163 is defined by annular shoulder 171 on barrel portion 43 and annular shoulder 173 provided by the lower end of mandrel portion 35. Pressure ring 174 is engaged with the upper end of spring stack 169 and is engageable with shoulders 171, 173.

The lower end of pocket 162 is defined by annular shouler 175 provided by the upper end of buried pin 38 connecting barrel portions 41, 43, and annular shoulder 177 formed by the upper end of mandrel portion 31. Pressure ring 183 is engaged with the lower end of spring stack 167 and is engageable with shoulders 175 and 177.

It will be apparent that for each spring means 151, 153 the mandrel is provided with upper and lower shoulders and the barrel is provided with upper and lower shoulders, and that since the mandrel and barrel shoulders do not overlap, they can pass each other whichever way the barrel and mandrel are moved axially relative to each other. Regardless of whether the damper is contracted or extended, pairs of mandrel and barrel shoulders will engage the pressure rings to cause the spring means to be compressed axially. Such action is indicated in the left and right hand halves of FIG. 3.

Neutral Position

Referring now to FIG. 1, the damper is shown in the unextended, uncontracted, or neutral position in which the spring means are of maximum length. In the neutral position, the shoulders 158, 160 on the mandrel flange 155 (FIGS. 3B', 3C') are co-level or in alignment with shoulders 159, 161 on barrel pin 46. At the upper end of spring means 153 (referring to FIGS. 3C' and 3C" for reference numbers but not for position), in the neutral position pressure ring 174 is engaged both with mandrel shoulder 173 and barrel shoulder 171. Similarly (referring to FIGS. 3A' and 3A" for reference numbers but not for position), in the neutral position pressure ring 183 is engaged both with mandrel shoulder 177 and barrel shoulder 175.

Travel Limits

A nut 189 is screwed onto a straight thread on the exterior of the upper end of mandrel portion 31. Nut 189 provides shoulder 191 at its lower end to engage barrel shoulder 175, forming therewith stop means limiting extension of the damper. Nut 189 is provided with a collar 193 which makes an interference (shrink) fit with the uppermost part of mandrel portion 31. A thin section 195 between collar 193 and the body of nut 189 facilitates sawing off the collar if the nut needs to be removed.

Pressure ring 183 is provided with an engageable surface 207 to engage shoulder 177 and an annular tongue 209 whose lower end 210 is adapted to engage shoulder 175. Tongue 209 spans nut 189 and the threaded connection between mandrel portions 31 and 33. Although the latter connection is a rotary shouldered connection as previously mentioned, it is also provided with an O ring seal 211 in case there is difficulty in applying adequate make up torque to the connection to effect a seal at shoulders 213, 215. Screw threads 217, 219 are straight (untapered) threads to facilitate make up.

The L-shaped cross-section of pressure ring 183, which provides tongue 209, permits shoulders 175 and 177 to be in different planes, i.e. non-coplanar, as occurs, e.g. because of the pressure of nut 189.

Means limiting contraction of the damper is provided by stop shoulder 208 (FIG. 2A') on the lower end of the barrel and stop shoulder 210 on the lower part of the mandrel. It will be seen that the possible contraction of the damper from the neutral position equals the possible extension from the neutral position. However they could be made unequal if desired.

Pressure-Volume Compensation Means

Referring now in part to FIG. 3C' and more particularly to FIG. 4, there is shown the upper part of the damper including mandrel portions 35 and 37 and barrel portions 43, 45, and 47. An annular volume 231 is formed between mandrel portion 37 and barrel portion 47. Due to the presence of cross over mandrel portion 35, mandrel portion 37 is of larger inner diameter than the outer diameter of the wash pipe formed by barrel portion 47; in other words, mandrel portion 37 is outside of barrel portion 47. Barrel portion 47 forms a part of and a continuation of the drilling fluid conduit means through the damper, which means, as previously mentioned, includes the passages 48, 50 through the interiors of tubular mandrel portions 31, 33.

Annular volume 231 between barrel portion 47 and mandrel portion 37 is closed by floating seal means 233 comprising tubular metal cartridge 235 carrying a plurality of sliding seal elements. Because barrel portion 37 is outside mandrel portion 47, an inversion of the usual barrel and mandrel relationship, any drilling fluid tending to flow through volume 231 must flow upwardly. Therefore detritus, sand and other particulates carried by the drilling fluid, when stopped by seal means 233, will fall down out of volume 231, away from seal means 233.

Summarizing, there is no problem of drilling fluid particulates accumulating above the seal means at either the lower or upper end of the damper, since the spaces above these seal means are filled with lubricating oil and since at the lower faces of these seal means any drilling fluid particulates will fall out of the seal means due to the force of gravity.

Floating seal means 233 includes double lip, spring loaded seal rings 237-240 on the interior of cartridge 235 to seal between the cartridge and the outside of wash pipe barrel portion 47. Similar seal rings 241-244 seal between the outside of the cartridge and the interior of mandrel portion 37. Seal rings 237-244, similar to the seal rings in seal means 51 at the lower end of the damper, are provided with preload springs 245-252 to press their lips apart into sealing engagement with the cartridge and barrel and mandrel portions. Also, wedge rings 253-260 are provided to allow for stacking the seal rings in series, to transmit forces from one seal ring to another, and to facilitate retention. The wedge rings are provided with weep holes, e.g. as shown at 261, for pressure balancing as in the case of the wedge rings forming parts of the sealing means at the lower end of the damper. The seal rings and wedge rings are retained on the cartridge against back up flanges 265, 267 by end rings 269-272 and snap rings 274-277, the latter being received in annular grooves in the ends of cartridge 235.

The whole seal means 233 is free to move as a unit axially up and down within volume 231, travel being limited by the upper end of the cartridge engaging annular shoulder 278 on washpipe barrel portion 47 and by the lower end of the cartridge engaging shoulder 279 on the upper end of mandrel portion 35. In normal operation the cartridge will never engage the stops. As long as the seal means is free to move, there is no pressure differential across it. It moves up or down so as always to be in contact with and supported by lubricating fluid 91 that fills the lubricant space between the barrel and mandrel in between pressure seal means 51 and floating seal means 233. Floating seal means 233 thus provides a pressure-volume compensator accomodating to changes in the volume of the lubricant space, allowing lubricating oil 91 to flow into the space 283 between washpipe barrel portion 47 and mandrel portion 37 when the lower part of the lubricant space between the barrel and mandrel reduces, and causing lubricating oil 91 to flow back into the space 283 when it enlarges, while keeping the lubricating oil separate from the drilling fluid at all times.

Lubricant Space

The space occupied by lubricating oil 91, extending from the lower part of the damper to the upper part thereof, may be traced from just above pressure seal means 51, past test probe electrode 93, between liner 121 and bearing surface 68, into space 281 between conical portions 123, 125, in between the splines 131, 133, 135 and grooves 137, 139, 141, through flutes 147, between channels 282, 284 cut across the lower ends of nut 189 and tongue 209 (e.g. when the nut and tongue engage shoulder 175 as in FIG. 3A'), past the outer and inner peripheries of ring 183 (and its tongue 209) inside barrel portion 42 and outside mandrel portion 33, through spring pocket 162 inside and outside spring stack 167, between pressure ring 165 and shoulder 160 or 161 (one of the other is out of contact with the ring except in neutral position), or in neutral position through radial channels 286 (or 288) across the uppermost face of ring 165 as it happens to be assembled, through annular space 156 between barrel and mandrel, between pressure ring 164 and shoulders 159, 158 (one or the other is out of contact with the ring except in neutral position), or in neutral position through radial channels 287 (or 289) across the lowermost face of ring 164 as it happens to be assembled, through spring pocket 163 inside and outside spring stack 169, between ring 174 and shoulder 173 when out of contact or between ring 174 and shoulder 171 when out of contact (one or the other shoulders is out of contact except in the neutral position), or in neutral position through radial channels 283 (or 285) across the uppermost face of ring 174 as it happens to be assembled, through annular spaces 204, 206, 208, and into uppermost space 283.

Motion of Floating Seal

It is to be noted that when the damper is in use, the desired end result is zero axial motion of the barrel, which is connected to the upper part of the drill string, despite up and down motion of the mandrel, which is connected to the drill bit. As the mandrel moves up and down the volume of the space between the parts of the mandrel and barrel delimited by the lower seal means and the volume compensator changes and the compensator moves up and down to accomodate for the volume change. Large volume changes occur at space 281 between conical surfaces 123, 125 (FIG. 2) and at space 283 above the upper end of mandrel portion 37. Floating seal means 233 (FIG. 4) therefore moves up and down rapidly relative to both barrel portion 47 and mandrel portion 37 during operation of the damper. In the embodiment shown, the axial travel of the floating seal is about 3/5 of the axial travel of the mandrel relative to the barrel. For this reason the outer periphery of washpipe barrel portion 47 and the inner periphery of mandrel portion 37 are each provided with a hard metal coating, e.g. nickel plated, as shown at 275 and 276, such coating having a low friction coefficient and a smooth finish. Both wash pipe barrel portion 47 and mandrel portion 37 are readily replaceable should they become unservicable for any reason.

Although floating seal means 233 moves rapidly up and down to accomodate changes in volume of the space occupied by the lubricating oil, it may also move up and down more slowly in response to changes in the volume of the oil itself as temperature and pressure change.

Seal Position Indicator

Still referring to FIG. 4, on the upper end of cartridge 235 is disposed a cap 291 having a skirt 293. A plurality of screws 296 cricumferentially spaced apart around the skirt extend through holes in the skirt into threaded holes in the cartridge. The upper end 297 of cap 291 has a conical top face pointing upwardly. Surmounting the cap is permanent magnet ring 299, which has a lower conical face correlative to the top face of cap 291, being suitably secured thereto, e.g. by epoxy cement or by sintering or soldering. Magnet ring 299 is magnetized radially, whereby its inner periphery is of one polarity and its outer periphery is of an opposite polarity. Cartridge 235 and wash pipe 47 are made of non-ferro-magnetic material, such as stainless steel. A magnetic probe, such as a steel building stud locator, lowered into wash pipe 47, will indicate the level of the magnet ring and hence of the floating seal. If the damper is fully contracted, as shown in FIG. 4A", the floating seal should be near its lowermost normal position due to the lubricant flowing into the space 283 at its top side. If the damper is fully extended, as shown in FIG. 4A', the floating seal should be near its uppermost normal position, due to the lubricant flowing away from space 283 at its top side. If the damper is in its neutral position, the seal should be in a normal median position, as shown schematically in FIG. 1.

If the seals leak so that there is a loss of lubricant from the chamber, the floating seal will be near its uppermost position, or at least above its normal position. If the seals leak in a manner that intrusion of well bore fluid increases the fluid in the chamber, the floating seal will be at its lowermost position or at least below its normal position.

Of course in both conditions, insufficient and excess liquid in the chamber, the problem may not be with the seals but rather be one of initial insufficient or excessive filling of the chamber with lubricant. Whatever the problem is, it can be corrected.

Springs

Referring again to FIG. 1, and more particularly to FIG. 3, each of spring stacks 167, 169 comprises a plurality of Belleville spring washers 321 positioned with their cones pointing up, interleaved with a plurality of Belleville spring washers 323 disposed with their cones pointing down. This mode of stacking places the spring washers in series. The more spring washers in series, the greater the damper deflection for any given axial load. The use of two spring stacks in parallel reduces the stress in each Belleville spring washers for any given deflection of the damper. If required, additional stacks of spring washers beyond two stacks e.g. three, four or more stacks may be paralleled to keep the stress in each Belleville spring washer below the elastic limit or below the endurance limit or any other desired limit.

It may be noted that merely making the spring washers thicker or placing some of the washers in each stack in parallel, that is with their cones pointing in the same direction, though reducing some of the stresses in the washers, will not entirely solve the problem. Making the washers thicker will actually make the tensile stresses on the inner faces of the washers greater. If washers are paralleled within the stack, there will be sliding friction between the washers thus paralleled. This sliding friction causes the outer washers of the spring stack to suffer damaging fatigue because the force of the vibration is not uniformly distributed to all the washers. Said another way, the inner washers of the stack are isolated from the vibration by the outer washers so that, while having the same average load, they are subject to a smaller amplitude of alternating load. This consequence arises from ingrtial and frictional causes. Therefore paralleling several separate stacks may be necessary in order to achieve the desired result.

Due to manufacturing tolerances, the length of a spring stack of a preselected number of spring washers may not exactly fit the cavity between mandrel and barrel. In such case, as shown only in FIG. 1, one or more flat washers or shims 280, 282, 284 may be employed to achieve the desired fit. Alternatively, pressure rings 164, 165, 174, 183 (FIG. 3) of varying thickness may be employed.

Variable Moment Belleville Springs

Due to the small seal, FIG. 1 shows spring stacks 167, 169 to be composed of ordinary Belleville spring washers, i.e. with cross sections having straight sides. Although such springs may be employed while obtaining some of the advantages of the invention, and may even be constructed to provide a variable modulus as set forth, e.g. at pp. 155-157 of Mechanical Springs, by A. M. Wahl, Second Edition, published by McGraw Hill Book Company, 1963, it is preferred to use variable moment arm Belleville springs of the general type disclosed in the aforementioned Migny patent. Furthermore it is preferred to use a particular form of variable moment arm Belleville spring, herein termed a roller Belleville spring, in which there is pure rolling between adjacent washers as they are loaded and unloaded, as next described.

Roller Belleville Springs

The Belleville spring washers 321, 323 are identical, merely being positioned oppositely during assembly. Such a spring washers is shown to a larger and more precise scale in FIG. 7. As there shown, the radius R'=R" of the outwardly and inwardly tilted faces of the spring washer is 10-11/64 inches. The outer diameter of the spring washer is typically 5.827 inches. The spring washer thickness is 0.250 inch and the cone angle is 3.75 degrees measured at the part of the spring washer midway between its inner and outer peripheries. It will be noted that the center O" of the radius R" for the outwardly facing face (the left hand face in FIG. 7) of the washer lies substantially on a line through the inner peripheral edge of such face parallel to the cone axis C of the washer. When the washer is stacked with others and assembled in the damper, the slight preload in the neutral position will cause the center of such radius R' to be exactly on said line.

Similarly it will be noted that the center O' of radius R' for the inwardly facing face (the right hand face of FIG. 7) of the washer lies substantially on a line through the outer peripheral edge of such face parallel to the cone axis of the washer. When the washer is stacked with others and assembled in the damper, the slight preload in the neutral position will cause the center of such radius R' to be exactly on said line.

With O' and O" so located for the neutral position of the damper, and R' being equal to R", the contacting areas of the washers of the inner and outer peripheries of the stack will, as shown in FIG. 7A, be tangent, the common tangents being shown at T' and T". As shown in FIG. 7B when the damper is deflected the contacting areas of the washer move closer together and remain tangent, the washers rolling upon each other without sliding. It will be noted that when the contacting areas of the washer move together so as to be in vertical alignment, that is, so that they are equidistant from the axis of the washers, the moment arm becomes zero and the spring has gone solid. During the motion from unloaded condition to the solid condition, only the inner portions of the washer faces that moment arm becomes zero and the spring has gone solid. During the motion from unloaded condition to the solid condition, only the inner portions of the washer faces that are in contact nearest the washer axis are engaged and only the outer portions of the washer faces that are in contact farthest from the washer axis are engaged, such portions being the functional portions of the surfaces. The non-functioning portions of the washer surfaces never engage any other surface.

With the foregoing background, the conditions for pure rolling of the washer may be summarized as follows:
(1) The contacting areas of the faces of the washers are tangent, to avoid pivoting.
(2) The washers are identical, i.e. of like size, thickness, dish (cone angle), and facial curvature, so that they will have equal angles of deflection and the same position of their respective neutral axes, as required to avoid slippage.
(3) To avoid sliding, the curves of the functional portions of the two opposite faces of each washer should be the same, i.e. one curve would be the double reflection of the other about a medial cone and a cone perpendicular thereto (complementary therewith).
(4) The curves of the functional portions of the cross sections of the surfaces of the washers must be continuously convex, to avoid bridging.

Figure 7C:
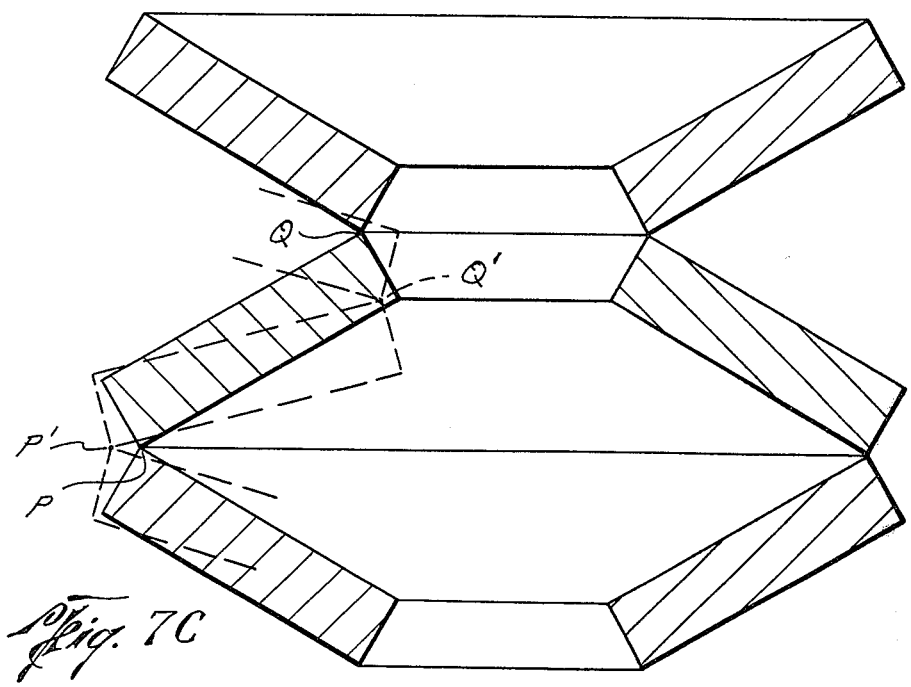
Figure 7D:
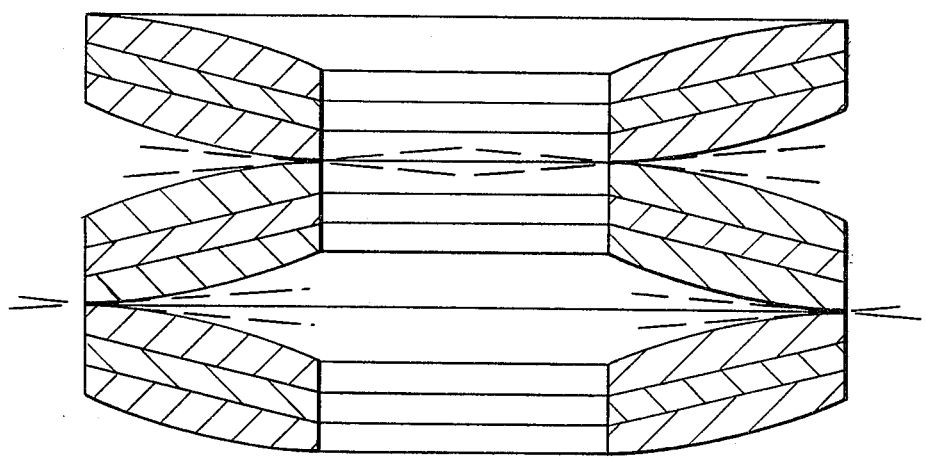
Figure 7E:
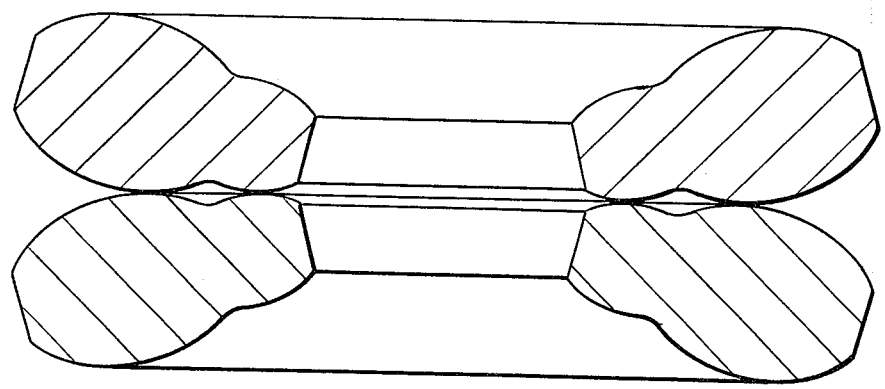

These requirements are met by the construction shown in FIGS. 7A and 7B, but are not satisfied by the ordinary Belleville spring washers of FIG. 7C nor the variable moment Belleville spring washers of FIG. 7D. In the case of the ordinary Belleville spring washers of FIG. 7C, the engaged surfaces are not tangent and the washers pivot about their outer peripheries as they are loaded and unloaded. In the case of the variable moment Belleville spring washers of FIG. 7D, the initially engaged surfaces of the washers are not tangent so that there is an initial pivoting of the washers about their peripheral edges when the springs are loaded, and even after the engaged areas have moved toward each other there is sliding because the curvatures of the engaged surfaces are unequal.

Relative to the requirement that to effect pure rolling the cross sectional curvature of the faces of the washers must be continuously convex, it may be noted that if there were any concavity in such cross-section there would occur during the compression of a stack of washers a position in which there would be two separate areas of contact between adjacent washers, the areas being on opposite sides of the concavity. This is the situation illustrated in FIG. 7E.

With the foregoing limitations, any shape of continuously convex cross-sectional curvature maybe used for the washer surfaces, and such curvature will define the force-deflection curve for the washer.

The particular cross-sectional curves for the roller Belleville spring washers shown in the preferred embodiment of FIGS. 7, 7A and 7B are arcs of circles. Actually, this curvature was selected as an approximation to an ellipse. As shown in FIG. 7F, if the washers are of elliptical cross-section there is no possibility of any pivoting therebetween. However the outer ends of the elippses never come into contact, so they can be chopped off; and that was done in the evolution of the preferred embodiment. Finally, it was decided to thicken the washers and this resulted in the FIG. 7 construction.

Figure 7F:
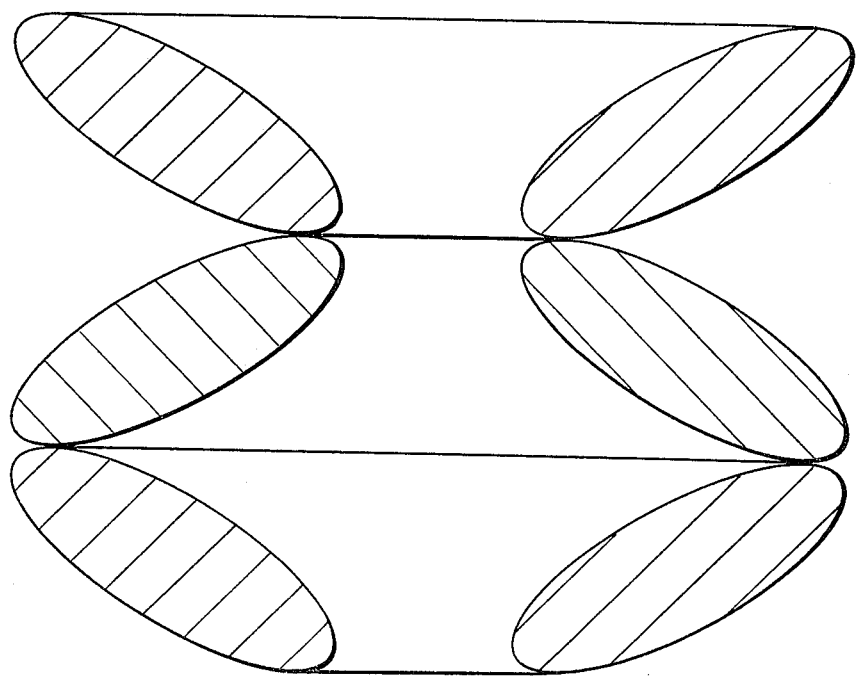

The faces of the FIG. 7 washer, viewed in cross-section, are therefore parts of two separate curves, rather than of a single curve, as in the case of the FIG. 7F elliptical cross-section washers.

The family of single curve washers of which the elliptical washer is but one example, include also, for example, paraboilically and hyperbolically curved washers.

With elliptical cross-section washers, it will be observed that at the limits of eccentricity there are the cases of zero eccentricity, corresponding to circular cross-section washers, which would have no spring action, and infinite eccentricity corresponding to parallel line cross-sections, the same as ordinary Belleville springs, which have a constant moment arm. Neither such extreme of eccentricity would therefore be suitable.

In considering the curvature of the faces of a roller Bellevillse spring washer, it must be borne in mind that only the functional portions of the faces of the washers are to be considered. Surfaces which never engage may be of any shape. For example, referring to an upwardly pointing washer, the inner portion of the upper face and the outer portion of the lower face are the functional surfaces which need to have particular cross-sectional curvature. The outer portion of the upper face and the inner portion of the inner face could, for example, be straight lines in cross-sections; such a configuration may be used to make the spring thicker and hence stiffer.

Spring Clearance and Guidance

Figure 5A:
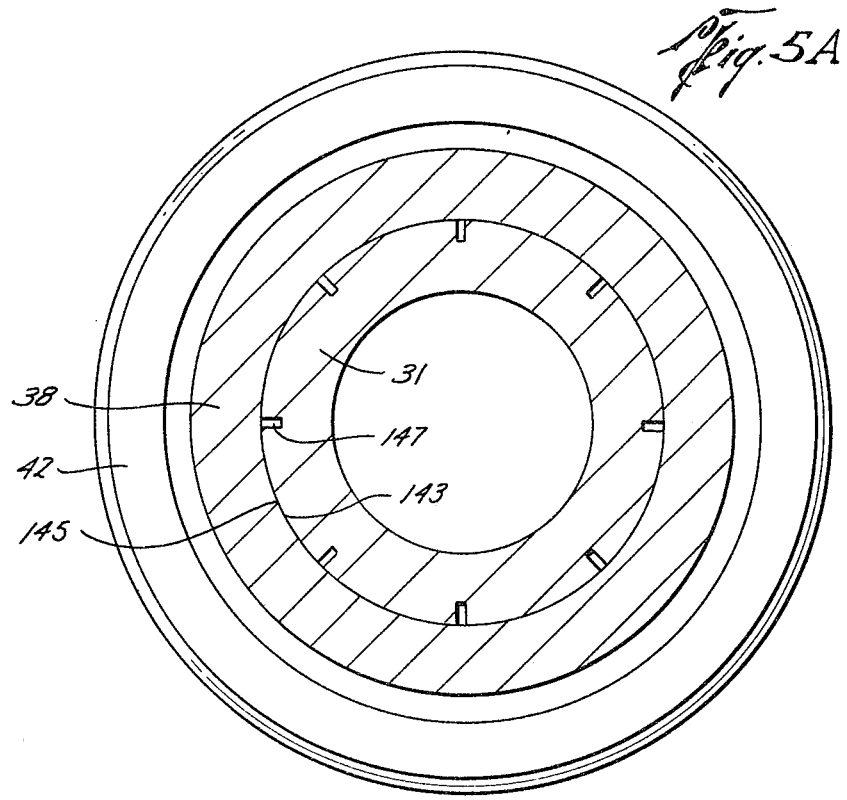
Figure 5:
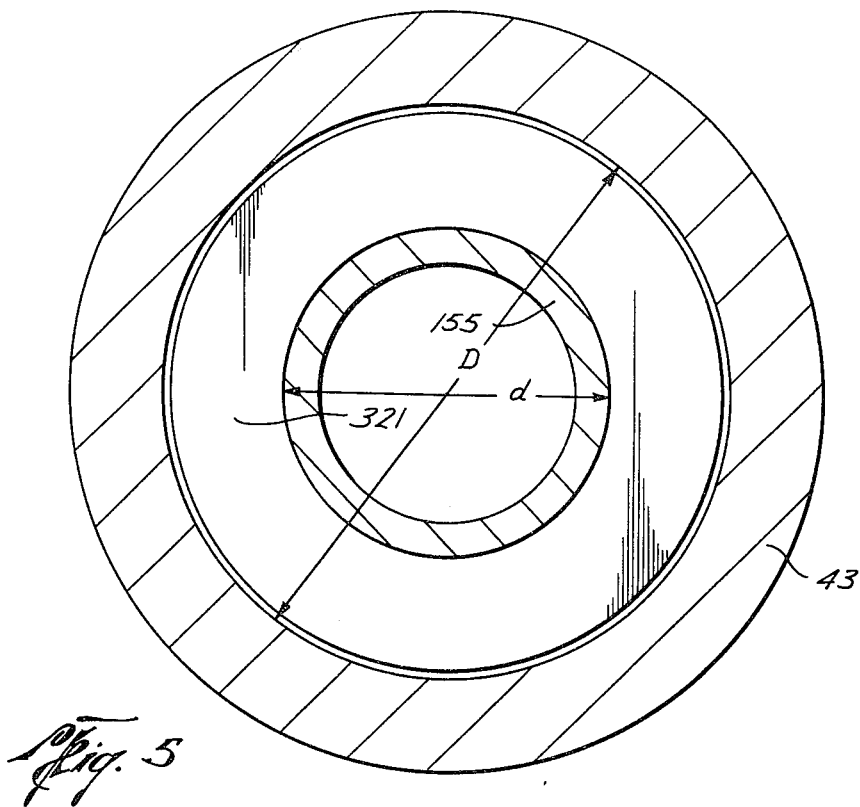

Referring once more to FIG. 7 the minimum diameter of the inner periphery of the washer is 03.543+0.005 inches, which is enough larger than the diameter d of the outer periphery of mandrel 33 (FIG. 5) that the spring washers can freely move up and down axially relative to the mandrel even when the damper is extended or contracted causing the washers to be compressed (flattened). If any part of the spring stack moves laterally, the mandrel will limit the movement, one or more of the spring washers making line contact with the side of the mandrel. The inner corners of the cross-section of the spring washer are more fully rounded to avoid cocking on the mandrel during assembly and to reduce stress concentration.

The outer periphery of the spring washers is considerably smaller than the inner diameter D (FIG. 5) of the barrel, so that the washers can expand circumferentially when they are compressed (flattened), as the damper extends or contracts, and still remain out of contact with the barrel. Also, there is left plenty of room for lubricating oil 91 to move past the washers.

If desired, the washers could more nearly make a close fit with the barrel and, at the same time, if so desired, less nearly make a close fit with the mandrel, relying on the barrel to limit lateral travel of the springs.

The minimum radial clearance between the inner and outer peripheries of the washers, and the adjacent outer periphery of the mandrel and inner periphery of the barrel required to accommodate for change in the spring washer diameters when flattened is only a few thousandths of an inch, which is less than that required by manufacturing tolerances.

Variable Spring Modulus

The spring stacks, when assembled in their respective pockets, are slightly compressed even when the damper is neither contracted nor extended, but only just enough to keep them from being loose in the pockets. In this condition, as shown in FIGS. 1 and 7A, the spring washers are in contact over circular areas near their inner and outer peripheries, each spring washer contacting either the inner or outer periphery of the spring washer above and the opposite (outer or inner) periphery of the spring washer below. This is the unloaded condition of the damper.

When the spring stacks are compressed, upon either contraction or extension of the damper, the circular areas of contact between the spring washers move away from the peripheries toward each other, i.e. towards the mid widths of the washers, as shown in FIG. 3. This results in a reduction of the leverage of the axial forces on the spring in their action to flatten the washers, causing the spring rate (force/deflection ratio) to increase. Roller Belleville springs thus have a pronounced variable spring modulus.

Figure 8:
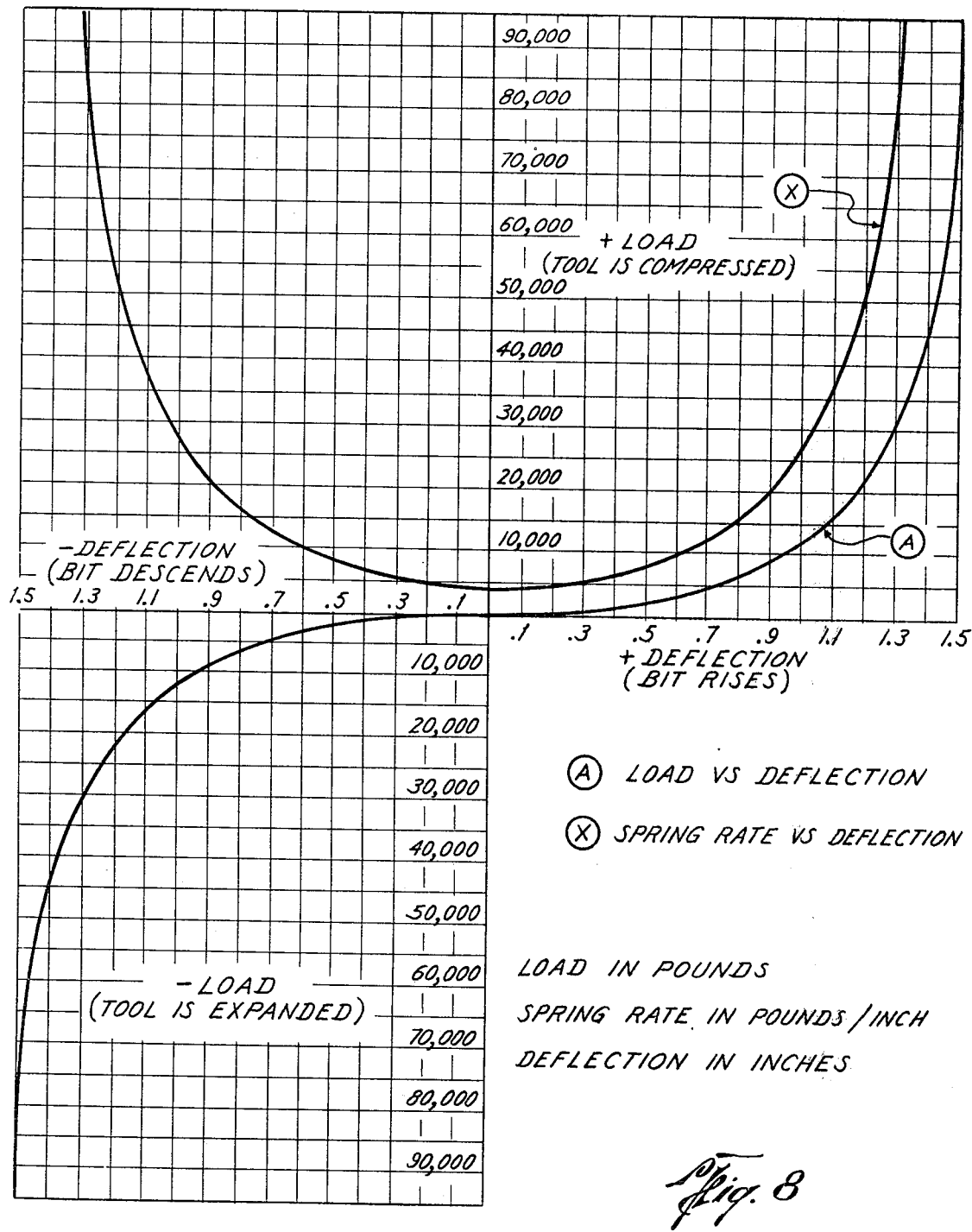

Referring now to FIG. 8, there are shown a curve A plotting spring force versus deflection, and also a curve X plotting spring rate versus deflection. Curve X shows a very low spring rate of the order of 4,000 to 10,000 lb./in. at moderate values of spring deflection, reflecting the low slope of the nearly straight line portion of the spring force deflection curve A below 10,000 lb. At a deflection of 1.0 inch, corresponding to a spring force of 12,500 lb., the spring rate is still less than 30,000 lb./in. Even at a deflection of 1.3 inches, corresponding to a spring force of 30,000 lb., the spring rate is but 85,000 lb./in. Only as the deflection approaches the travel limit of 1.5 inches does the spring rate exceed 100,000 lb./in. to bring the damper travel to a cushioned stop.

Double Action

FIG. 8, curve A, also shows that for negative loads, i.e. loads tending to extend the damper, the load deflection curve is reflected about the ordinate. In other words, the same load deflection curve, except with negative deflections, applies. That is because the resilient means is being stressed regardless of whether the damper is being contracted or extended. In fact, in the preferred embodiment the same spring means is strained in the same way (flattened) regardless of whether the damper is contracted or extended. Curve A further shows that the spring rate remains low over a wide range of deflection, both positive and negative from the neutral or zero deflection position.

Balanced Load Drilling

Referring now to FIG. 9, there is shown curve A, which is the same as curve A of FIG. 8, plotting spring force as a function of spring deflection. FIG. 9 also shows a curve B plotting spring force as a function of decreasing spring flexibility, that is, the abscissae scale of curve B has its origin at a flexibility of 25 inches per 100,000 pounds, with decreasing flexibility proceeding away from the origin. Also, flexibility is plotted as positive both to the left and to the right of the origin; this accounts for the fact that the flexibility curve includes a portion in the lower left hand quadrant rather than in the upper left hand quadrant. Flexibility is the reciprocal of spring rate; therefore curve B is closely related to curve X of FIG. 8. However spring rate curve X is plotted against deflection whereas curve B plots spring force against flexibility. Note further that in curve X, spring rate is plotted as ordinates, whereas in curve B flexibility is plotted as abscissae. In fact in FIG. 8, one should consider the abscissae, the deflection, as the independent variable, reflecting the fact that the bit moves up and down as the contour of the bottom changes, to come extent regardless of what force is imposed on the bit, whereas FIG. 9 is best appreciated viewing the ordinates, the spring force, as the independent variable, reflecting the information known to the driller, i.e. the static load on the damper.

It may be noted here that although the static load on the damper is the difference between the drilling weight and the pump apart force, the load on the bit is the drilling weight, unaffected by the pump apart force. Although the pump apart force acts down on the bit, it also acts upwardly on the swivel to relieve the drawworks of some of the drill string weight. Since drilling weight is calculated on the basis of weight of drill string less line tension, the upward pump apart force, which actually further reduces the unsuspended weight of the drill string, equals the downward pump apart force acting to increase the force on the bit over that which is due to the unsuspended weight of the drill string. In other words, the pump apart force is neglected twice with opposite effect.

FIG. 9, in the upper left hand quadrant, includes a table showing typical drilling conditions. The items in the table, and elsewhere in FIG. 9, that are marked with a check mark, correspond to a near balanced load condition, CONDITION I, including an average drilling weight of 45,000 pounds and an average pump pressure of 1,500 psi corresponding to a pump apart force of 44,000 pounds. The items marked with an asterisk correspond to an extreme condition, CONDITION II, wherein the pump apart force dominates, the pump pressure of 2,000 psi producing a pump apart force of 59,000 pounds compared to a drilling weight of only 30,000 pounds, a difference of 29,000 pounds acting to expand or extend the damper. The items marked with a double dagger correspond to an extreme condition, CONDITION III, wherein the drilling weight dominates, the pump pressure of only 1,000 psi producing a pump apart force of only 29,000 pounds compared to a drilling weight of 60,000 pounds, a difference of 31,000 pounds acting to compress or contract the damper.

Having noted the parameters in the upper left hand quadrant of FIG. 9, one may refer to the scale of pump pressures at the lower left hand side of FIG. 9. There, selecting a pump pressure of 1,500 psi, marked with a check mark, and following the heavy line in the direction of the arrows, one finds that this pressure corresponds to 44,000 pounds of pump apart force, a negative force, i.e. one expanding the damper, to which one adds a positive force of 45,000 pounds of drilling weight to provide a net force of 1,000 pounds contracting the damper, at which load the flexibility of the damper is a maximum, i.e. 25 inches per 100,000 pounds. This is CONDITION I.

Further exploring FIG. 9, one may start at the lower left at a pump pressure of 2,000 pounds marked with an asterisk, and following the dotted line one first notes that this pump pressure produces a pump apart force of minus 59,000 pounds. To this is then added a drilling weight of 30,000 pounds leaving a net negative force of 29,000 pounds expanding the damper, at which point the flexibility of the damper is 0.85 inch per 100,000 pounds. This is CONDITION II.

Condition III may also be traced on FIG. 9, starting at the lower left with a pump pressure of 1,000 psi, marked with double dagger. Following the broken line one finds that 1,000 psi pressure corresponds to a pump apart force of minus 29,000 pounds. Adding a drilling weight of 60,000 pounds creates a net contractive force on the damper of 31,000 pounds, which corresponds to a flexibility of 0.80 inch per 100,000 pounds, substantially the same as for CONDITION II.

Assuming a case wherein the pump apart effect balances the unsuspended weight of the drill string (drilling weight), identified as CONDITION I in FIG. 9, there is no static load on the damper spring and the damper will operate about the zero load, zero deflection point, the origin of the FIG. 9 load-deflection curve, which is the neutral position as previously defined. The damper will then be very soft and very little motion will be transferred to the drill string. This is in contrast with single acting variable modulus dampers in which under balanced load condition alternate half cycles of vibration would cause engagement of the travel stops, thereby losing the benefit of the low spring rate on alternate half cycles of damper vibration.

Consider next the case of drilling with unbalanced load. As the unbalance increases, the flexibility at the static deflection point decreases. However, at a load unbalance of plus or minus 10,000 lb., the flexibility is still over 4 inches per 100,000 lb., which is very high, and the deflection is about 0.95 in. which leaves 0.55 inch of travel to the nearest travel stop.

It may be noted here that the drop in flexibility from 25 inches per 100,000 pounds under balanced load conditions to 4 in./100,000 lb. at 10,000 pounds unbalance appears to be major. However the amplitude of transmitted vibration to impressed vibration is actually more nearly a function of the reciprocal of flexibility, i.e. of spring rate, and as appears from FIG. 8, at a deflection of 0.95 in. the spring rate is only about 23,000 pound/in., which is still quite low.

If the drilling weight exceeds the pump apart effect, or vice versa, by thirty thousand pounds, the conditions are those identified on FIG. 9 as CONDITION II and CONDITION III. Conditions II and III represent extreme conditions of load unbalance which are met in practice perhaps only about 5 percent of the time. However even under these conditions although the action of the damper is not as good as under balanced load, the damper, having a flexibility of 0.8 or more and a travel of 0.2 in to the nearest stop, is still soft enough to dampen substantially transmission of vibration to the drill string. The damper therefore may be used with varying degrees of effectiveness over a typical range of drilling weights in the range from 30,000 pounds to 60,000 pounds and pump apart forces in the range from 30,000 pounds to 60,000 pounds corresponding to a 6⅛ inch diameter seal area (e.g. 8 inch diameter damper) with pump pressure in the range of 1,000 psi to 2,000 psi.

Stroke

Assuming the drill string above the damper to be at rest vertically, the damper needs to have sufficient contractive and extensive stroke to allow for the maximum anticipated rise and fall of the drill bit without having the damper become inoperative by the travel limit stops becoming engaged or the springs reaching their limit of deformation (going solid i.e. flat in the case of Belleville springs). It will be seen from FIG. 8 that the damper has a working range of plus or minus one inch deflection with a very low spring rate when the pump apart effect balances the drilling weight. Even at the extreme condition of a thirty thousand pound difference (plus or minus) between drilling weight and pump apart effect, there is still available a travel of about 0.2 inch in the direction toward the nearest travel limit stop before the spring rate of the spring stacks becomes exceedingly high.

Parallel Stacks

Figure 9A:
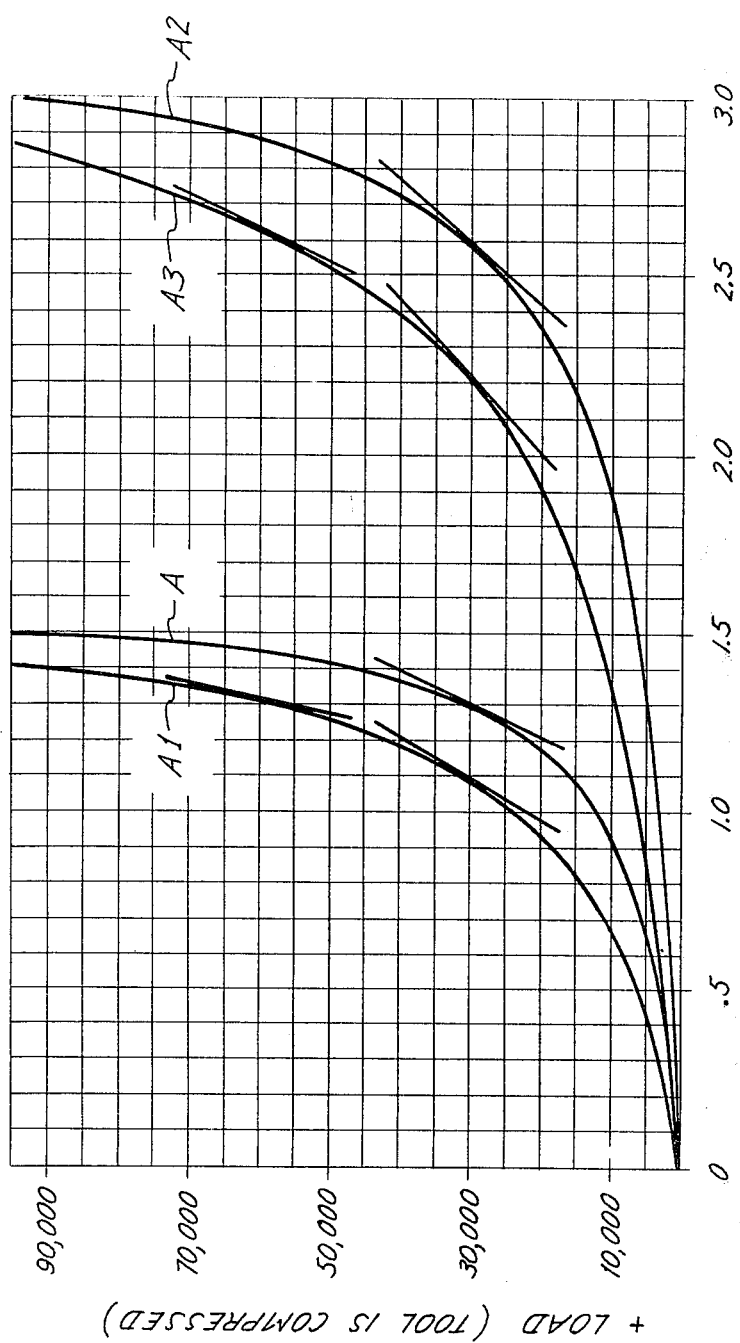
Figure 10:
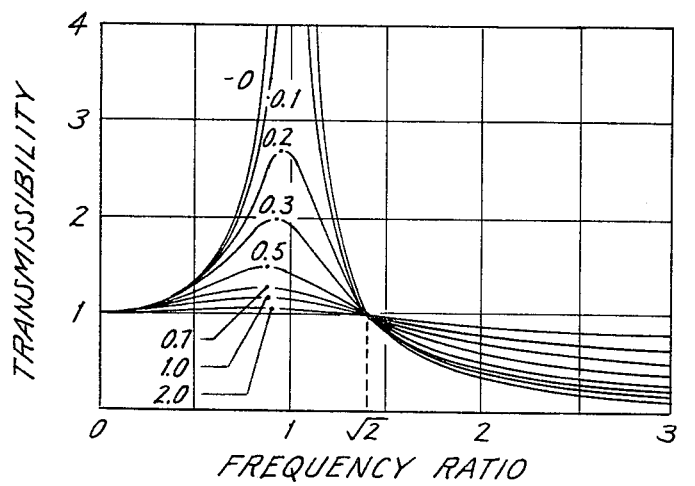

If one is willing to accept a higher spring rate at balanced load, the available travel to the nearest stop for any given unbalanced load and the spring rate at that load can both be enhanced by employing additional stacks of springs in parallel. Referring to FIG. 9A, curve A shows the load deflection curve for the previously described apparatus. Curve A1 shows the result of employing four stacks of springs in parallel (twice as many as for Curve A). It is seen that although the spring rate for balanced load is doubled (twice the slope), it is still very low, and at 30,000 lb. static load the deflection is only 1.1 inch, leaving 0.4 inch travel to the nearest stop (compared with 0.2 in. for curve A) and the spring rate is lower (lower slope) than for curve A.

Curve A1 also shows that at 60,000 lb. static load (twice the limit of the working range for the damper of Curve A) the deflection is only 1.3 inches, the same as for a 30,000 lb. load in the case of the curve A damper (although the spring rate is greater for curve A1 at 60,000 lb. than for curve A at 30,000 lb.

Summarizing, by putting more variable modulus springs in parallel, one can not only reduce the deflection, but also reduce the spring rate at the same 30,000 lb. static load, or increase the static load for the same 1.3 inch deflection.

If an overall longer stroke is required, the lengths of the spring stacks can be increased. For example, referring now to curve A2 of FIG. 9, by doubling the length of the spring stacks, the low spring rate working range would become plus or minus two inches, and there would be a travel of about 0.4 inch to the nearest travel stop when static load is unbalanced by 30,000 pounds.

Lengthening the spring will also lower the spring rate in the middle of the range, e.g. at the neutral position. Therefore if it is desired to increase the working range of unbalanced load as well as increase the stroke, without sacrificing flexibility at any load, additional stacks of springs in parallel may be employed. For example, by both doubling the lengths of the springs and employing twice as many in parallel as shown in curve A3, the same low spring rate at midrange as for curve A will be achieved, and the unbalanced load working range for the same maximum spring rate within the range will be increased to plus or minus 60,000 lb. with a travel limit of 0.4 inches to the nearest stop.

It is to be particularly noted from curve A3 that by doubling the spring length and the number of stacks in parallel, the travel to the nearest stop at plus or minus 30,000 pounds would be increased to 1.08 inches and the spring rate would be only about 25,000 lb/in. This improved effect achieved with the seriating and paralleling of variable modulus springs is in contrast with that achieved with constant modulus springs where only the travel to nearest stop would be increased without any change in spring modulus.

COMPARISON

The subject construction with a stroke of plus or minus 1.5 inches and a spring rate of 30,000 lb./in. or less over a range of plus or minus one inche when operating under balanced load conditions, is to be compared with the result that would be obtained with a constant spring rate and with single acting spring means.

First of all consider the situation with a constant spring rate single acting spring means having a spring rate of 4,000 lb. per inch, corresponding to the spring rate of the present construction at zero deflection. Upon imposition of a static load of thirty thousand pounds, the deflection would be 7.5 inches, which is way beyond the range of travel of the assumed situation. To accommodate such a stroke, the seals, spline, and guide bearings would all have to be lengthened, as well as providing a spring of such a stroke. The question arises if this problem could be overcome merely by changing the position of the travel limit stops. The answer is simply, no. If the stops were set to limit deflection to plus or minus 1.5 inch, upon imposition of an unbalanced static load of only 6,000 pounds the damper would be in engagement with one stop and therefore inoperative on alternate half cycles.

At this point one may introduce the concept of the load carrying capability of a spring. This is th maximum load which a spring can carry without going solid, or otherwise expressed, the maximum load which a spring can carry and still function as a spring, i.e. as a device in which the ratio of load to deflection per unit length of spring is less than the modulus of elasticity of the material of which the spring is made. In this case, unless the spring of the spring means has a load carrying capacity of thirty thousand pounds, it will not be effective as a spring upon imposition of a 30,000 pound load, no matter where the travel limit stops are placed. If a spring is soft, it likely will have a low load carrying capacity.

Consider next a damper with a constant spring rate of 30,000 lb./in., near the maximum rate for the damper of the present invention, when operating under balanced load conditions. Under a static load of 30,000 lb., the spring deflection would be one inch, leaving only a half inch of travel to reach the nearest travel limit stop. Since a one inch deflection is to be expected according to the original assumptions, such a damper would strike its travel limit stop once during each cycle of vibration, there being no increasing modulus as the stop is approached to cushion the end of the travel.

To provide a one inch travel to the nearest stop when operating with a 30,000 lb. static load, the spring rate would have to be such that the static deflection would be only one-half inch $(1.5-1.0=0.5)$. In other words, a constant spring rate of $30,000/0.5=60,000$ lb./in. would be required. This is fifteen times as stiff as the zero deflection spring rate of the previously described construction embodying the invention. In addition, should there be any abnormal deflection of a damper with the assumed 60,000 lb./in. constant spring rate, the damper would strike its travel limit stop. In contrast, the spring means of the present construction, being of increasing spring rate as the deflection approaches the limits, will still effect a cushioned stop upon abnormal deflection, even though the cushioning will be less than under normal conditions.

Consider next the case of a known damper employing a variable modulus spring but with single action. Such a damper operating under balanced load would strike its travel limit stop once during each vibration.

CONSTANT BIT LOAD DRILLING

The type of drilling contemplated by the present invention may be further understood by referring once more to FIG. 8. It will be seen from curve X that for deflections between plus and minus 0.5 inches the spring rate is nearly constant and quite low. Therefore, if drilling is conducted in such a manner that the pump force balances the drilling weight so that the static deflection of the damper is zero, the damper will allow the drill bit to move up and down following the contour of the bottom of the hole under the constant downward force of the pump apart force with very little force variation transmitted to the drill string through the damper. Since the bit will remain in contact with the bottom of the hole with the desired force on bottom, drilling should proceed in a most efficient manner and at the same time there will be minimum wear and tear on the drill string.

ROLLER BELLEVILLE SPRING DAMPER

Figure 11:
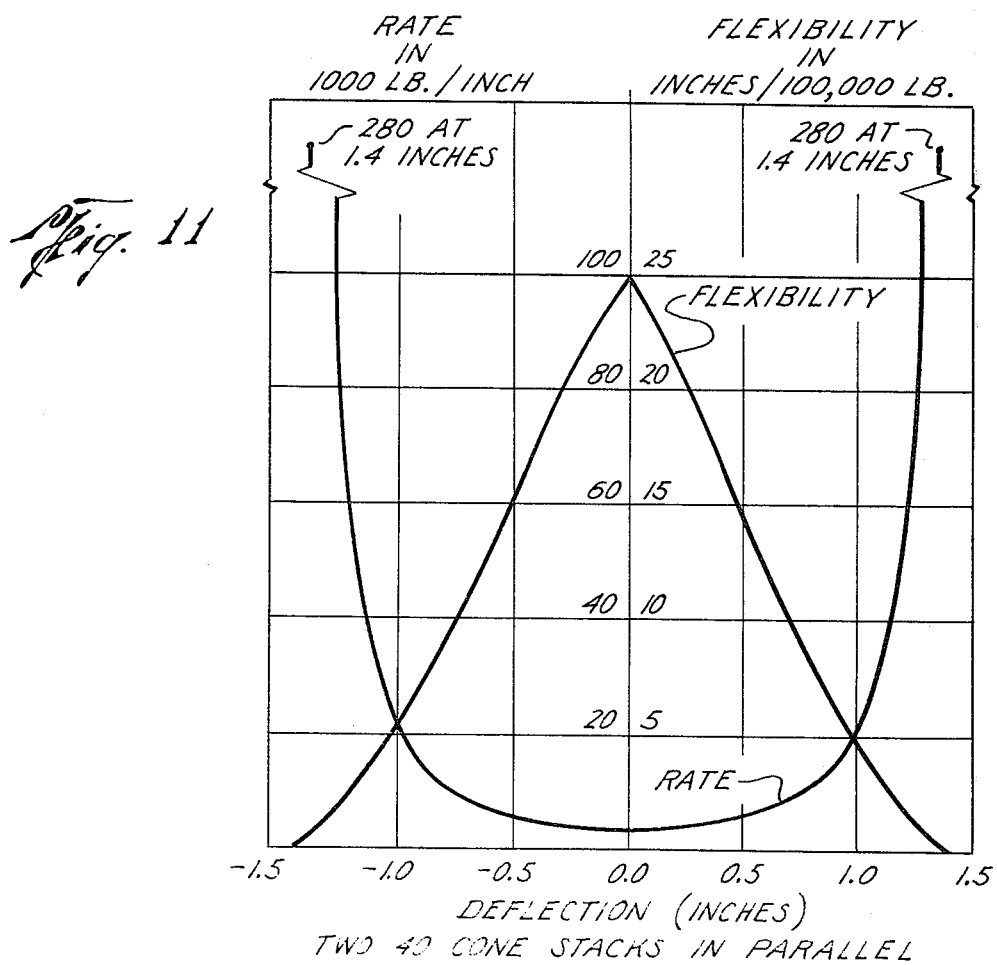

Some consideration has already been given to roller Belleville springs in the section hereof entitled Springs. At this point it is desired to point out a characteristic of the preferred form of spring which is distinctive. Referring to FIG. 11 there is plotted a curve showing spring rate versus deflection which is similar to curve X of FIG. 8, the only difference being that FIG. 8 has reference to spring means in which there are 38 cones per stack whereas FIG. 11 has reference to spring means in which there are 40 cones per stack; resulting in a stroke which is nearly six percent longer, as may be desirable in some cases. As in the case of the spring means whose curve is plotted in FIG. 8, the spring means whose curve is plotted in FIG. 11 exhibits a very low spring rate at zero deflection and over a considerable range of deflection in both directions, the spring rate being below 13,000 lb./in. up to plus or minus 0.85 inches of deflection and being only 5,000 lb./in or less over a range extending from neutral position to plus or minus one half inch.

FIG. 11 also plots spring flexibility versus deflection. It will be seen that the flexibility curve consists of two, like, nearly straight line (linear) sections at the left and right of the point of zero deflection extending to and beyond plus or minus one inch deflection. A roller Belleville spring of preferred form according to the invention may therefore be characterized as one having a flexibility function of LAMBDA or inverted V shape centered at zero deflection.

Properties of a variable moment Belleville spring, and especially of a roller Belleville spring, that are particularly advantageous in a drill string damper, may be enumerated as follows:

(1) The deflection is delimited while load bearing capacity is enhanced.

(2) The positive tensile stresses (those due to tension) are held under control, thus allowing greater fatigue life.

(3) The spring rate is non-linear.

(4) With particular reference to roller Belleville springs, friction is reduced, lowering transmission of vibration, and more uniformly distributing the vibration among spring washers thereby increasing spring life.

The desirability of using low friction spring means, especially in conjunction with low friction seals and lubricated splines, was treated mathematically earlier in discussing the prior art.

Roller Belleville cones (washers) stacked in series have a low friction. When used in a double acting device, it is possible to exploit their non-linearity to the best advantage. The small friction provides for a low damping factor while the small spring rate insures that $f/f_n$ is greater than $(2)^{\frac{1}{2}}$.

A double acting roller belleville vibration damper at the bottom of a shallow hole drill string of mass 20,000 with an initial spring rate of 5000 lb/in would have a natural frequency of 1.6 cycles per second, already well below the applied frequency (2.5 to 10 hz).

While a preferred embodiment of the invention has been shown and described, many modifications thereof can be made by one skilled in the art without departing from the spirit of the invention.

I claim:

1. Double acting resilient telescopic unit for use in a drill string to reduce transmission of vibration from the drill bit to the upper drillstring, i.e. that part of the drill string above the drill bit, said unit comprising
   a splined sealed tubuler telescopic joint,
   variable spring modulus resilient means urging the joint to a zero deflection neutral position with like force upon equal deflection, whether contraction or extension, from neutral position, and
   means to contract the length of and thereby equally increase the strain of the resilient means upon equal departures from neutral position upon both extension and contraction of the joint,
   said resilient means comprising variable moment arm Belleville springs providing a low spring rate over a working range of travel constituted by positive and negative deflections from said neutral position and a gradually increasing and then sharply increasing spring rate as the limits of both extension and contraction of the joint are approached upon farther positive and negative deflection respectively,
   said units, when employed between a three cone rock bit and an upper drill string having a mass of 32,000 pounds, rotating at one revolution per second, providing at said zero deflection neutral position, a frequency ratio in excess of the square root of two.

2. Unit according to claim 1,
   said unit having a flexibility function of substantially inverted V shape centered at zero deflection.

3. Unit according to claim 1,
   said unit having a spring rate of less than 13,000 lb/in over a range of deflection of plus or minus 0.8 inch and over 100,000 lb/in at a deflection of plus or minus 1.4 inch.

4. Unit according to claim 1,
   said unit having a spring rate of less than 5000 lb/in at zero deflection.

5. Unit according to claim 1,
   said Belleville springs being roller Belleville springs.

6. Tool useful in earth boring by the rotary system comprising:
   telescopically disposed mandrel and barrel members,
   connection means at one end of each member for making connection with a rotary drill string component,
   means for transmitting torque between said members while allowing relative axial motion therebetween,
   resilient means separate from the last mentioned means for resiliently transmitting axial forces between said members upon relative axial motion of said elements in both directions form a neutral position of minimum stress of said resilient means, said resilient means having a non-linear force displacement characteristic requiring equally increasing force for unit displacement the farther said members are displaced in either direction from said neutral position,
   said mandrel and barrel members being tubular providing a flow passage therethrough,
   sliding pressure seal means between said members sealing said flow passage against fluid flow from said passage outwardly through said tool between said elements and vice-versa,
   floating seal means between said members forming with said pressure seal means an annular chamber between said members,
   lubricant in said chamber, said resilient means being disposed in said chamber,
   said resilient means being at all times, as said members move axially relative to each other, radially spaced from one of said members and freely movable axially relative to the other of said members,
   said resilient means comprising a stack of roller, variable moment arm Belleville spring washers.

7. Tool according to claim 6,
   said roller, variable moment arm Belleville spring washers being stacked solely in series within the stack.

8. Tool according to claims 5, 6, or 7, said resilient means being variable moment arm roller Belleville spring washers stacked in series within the stack and characterized as follows:
   (a) the contact areas of adjacent faces of the washers are always tangent,
   (b) the washers are identical, (c) the engageable portion of the upper face of each washer is a double reflection of the washer about conjugal medial conical surfaces coaxial with the washer, one medial conical surface lying midway between the faces of the water and the other medial conical surface being midway between the inner and outer peripheral edges of the washer, (d) the engageable portions of the faces of each washer are continuously convex in cross-sections through planes in which lies the washer axis.

9. Subject matter of claim 8 wherein
the entire upper face of each washer is a reflection of the entire lower face about a medial conical surface coaxial with the washer.

10. Unit according to claim 1,
said resilient means including another stack of variable moment Belleville spring washers, said stacks being in parallel.

11. Unit according to claim 10,
each Belleville spring washer having surface contour, thickness, cone angle, and inner and outer diameter such as to result in the resilient means having a substantially linear flexibility-deflection function, with highest flexibility at zero deflection.

12. Unit according to claim 11, said washers being roller Belleville spring washers.

13. Unit according to claim 10,
said resilient means having a spring rate of about 5000 lb/in or less over a range of deflection of plus or minus one inch.

14. Unit according to claim 10,
the spring washers in each group being stacked entirely in series.

15. Well tool comprising a mandrel, an outer tube telescopically disposed about the mandrel, and resilient means to transmit force between said mandrel and tube, said resilient means comprising a first stack of variable moment arm Belleville springs washers disposed between said mandrel and barrel and a second like stack of variable moment arm spring washers disposed between said mandrel and barrel, and means for transmitting axial force between the mandrel and barrel through said stacks in parallel, whereby the load-deflection modulus at certain deflections of the resilient means is less than that of one of the stacks acting alone at the same load.

16. Well tool comprising a mandrel an outer tube telescopically disposed about the mandrel, and resilient means to transmit force between said mandrel and tube, said resilient means comprising a stack of roller, variable moment arm Belleville spring washers, said washers being stacked solely in series within the stack, whereby there is no sliding friction between the washers in each stack as the length of the stack changes under load.

17. Tool according to claim 16,
said stack of roller, variable moment arm Belleville spring washers being characterized as follows:
(a) the contact areas of adjacent faces of the washers are always tangent,
(b) the washers are identical,
(c) the engageable portion of the upper face of each washer is a double reflection of the engageable portion of the lower face of the washer about conjugal medial conical surfaces coaxial with the washer, one medial conical surface being midway between the inner and the outer peripheral edges of the washer,
(d) the engageable portions of the faces of each washer are continuously convex in cross-sections through planes in which lies the washer axis.

18. Tool according to claim 17, wherein
the entire upper face of each washer is a reflection of the entire lower face about a medial conical surface coaxial with the washer.

19. For use in a tool of the character described a stack of roller, variable moment arm, Belleville spring washers characterized as follows:
(a) the contact areas of adjacent faces of the washers are always tangent,
(b) the washers are identical,
(c) the engageable portion of the upper face of each washer is a double reflection of the engageable portion of the lower face of the washer about conjugal medial conical surfaces coaxial with the washer, one medial conical surface lying midway between the faces of the washer and the other medial conical surface being midway between the inner and outer peripheral edges of the washer,
(d) the engageable portions of the faces of each washer are continuously convex in cross-sections through planes in which lies the washer axis.

20. Subject matter of claim 19, wherein
the entire upper face of each washer is a reflection of the entire lower face about a medial conical surface coaxial with the washer.

21. Subject matter of claim 19,
said washers being stacked entirely in series within the stack.

22. Subject matter of claim 7, 8, 17, 18, 19, or 21,
the meridians of the contacting faces of the washers including arcs of circles having their centers of curvature lying on two sets of lines parallel to but offset from the cone axis,
one of said sets of lines, hereinafter referred to as an inner set, being closer to the cone axis then the other set, the latter set being hereinafter referred to as the outer set,
the centers of curvature of the faces of the washers which are concave viewed from the cone axis of the washers lying on the inner one of said sets of lines and the centers of curvature of the faces of the washers which are convex viewed from the cone axis of the washers lying on the outer one of said sets of lines,
each of said sets of lines passing through points on arcs of said circles which lie in planes tangent to said circles perpendicular to the cone axis of the washer.

23. Subject matter of claim 22, said inner set of lines passing through the inner peripheries of the washers, said outer set of lines passing through the outer peripheries of the washers.

* * * * *

UNITED STATES PATENT AND TRADEMARK OFFICE
CERTIFICATE OF CORRECTION

PATENT NO. : 4,276,947

DATED : July 7, 1981

INVENTOR(S) : James Bracken Hebel

It is certified that error appears in the above—identified patent and that said Letters Patent is hereby corrected as shown below:

Column 4, line 52: before "this regard" insert -In-.
Column 8, line 52: change "beteen" to -between-.
Column 11, line 13: change "pressure" to -presence-.
Column 12, line 45: change "of" to -or-.
Column 13, line 32: change "cricumferentially" to -circumferentially-.
Column 14, line 34: change "ingrtial" to -inertial-.
Column 14, line 47: after "Due to the small" delete "seal" and insert -scale-.
Column 14, line 51: after "advantages of the" insert -aforementioned Garrett-.
Column 15, lines 35-38: delete the sentence beginning with "During the motion".
Column 16, line 45: change "paraboilacally" to -parabolically-.
Column 16, line 58: change "Bellevillse" to -Belleville-.
Column 18, line 43: change "come" to -some-.
Column 21, line 14: after "working range" delete "of" and insert -at-.

UNITED STATES PATENT AND TRADEMARK OFFICE
CERTIFICATE OF CORRECTION

PATENT NO. : 4,276,947

DATED : July 7, 1981

INVENTOR(S) : James Bracken Hebel

It is certified that error appears in the above—identified patent and that said Letters Patent is hereby corrected as shown below:

```
Column 21, line 14: change "load" to -loads-.
Column 21, line 38, change "inche" to -inch.
Column 21, line 60, change "th" to -the-.
Column 23, line 40, change "belleville" to -Belleville-.
```

IN THE CLAIMS:

```
Column 24, line  4: change "units" to -unit-.
Column 25, line 46: change "mandrel" to -mandrel,-.
Column 26, line 38: change "8," to -16,-.
Column 26, line 57: change "washer" to -washers-.
```

Signed and Sealed this

Seventh Day of December 1982

[SEAL]

Attest:

GERALD J. MOSSINGHOFF

Attesting Officer        Commissioner of Patents and Trademarks